United States Patent
Chen et al.

(10) Patent No.: US 12,423,031 B2
(45) Date of Patent: Sep. 23, 2025

(54) DATA PROCESSING METHOD, DATA PROCESSING APPARATUS, AND RELATED DEVICE

(71) Applicant: HUAWEI TECHNOLOGIES CO., LTD., Guangdong (CN)

(72) Inventors: Geng Chen, Hangzhou (CN); Jitang Lei, Hangzhou (CN); Ming Fu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/589,722

(22) Filed: Feb. 28, 2024

(65) Prior Publication Data

US 2024/0201907 A1 Jun. 20, 2024

Related U.S. Application Data

(63) Continuation of application No. PCT/CN2022/111739, filed on Aug. 11, 2022.

(30) Foreign Application Priority Data

Aug. 31, 2021 (CN) .......................... 202111015761.0

(51) Int. Cl.
 G06F 3/06 (2006.01)
 G06F 5/12 (2006.01)
(52) U.S. Cl.
 CPC .......... *G06F 3/0659* (2013.01); *G06F 3/0604* (2013.01); *G06F 3/0644* (2013.01); *G06F 3/0673* (2013.01); *G06F 5/12* (2013.01)
(58) Field of Classification Search
 None
 See application file for complete search history.

(56) References Cited

U.S. PATENT DOCUMENTS 5,948,082 A * 9/1999 Ichikawa .............. G06F 3/0656
 710/52
9,003,131 B1 * 4/2015 Lunev ................... G06F 3/0656
 711/147

(Continued)

FOREIGN PATENT DOCUMENTS

CN 110704335 A 1/2020
GB 2581836 A 9/2020

OTHER PUBLICATIONS

Lee et al., "A Lock-Free, Cache-Efficient Shared Ring Buffer for Multi-Core Architectures," ANCS '09: Proceedings of the 5th ACM/IEEE Symposium on Architectures for Networking and Communications Systems, Oct. 19, 2009, 2 pages.

(Continued)

*Primary Examiner* — Kaushikkumar M Patel
(74) *Attorney, Agent, or Firm* — Fish & Richardson P.C.

(57) ABSTRACT

This application relates to data processing methods and devices. An example method includes obtaining a first global read pointer of a circular storage queue, where the circular storage queue includes a plurality of storage areas, and the first global read pointer points to a first storage area in the plurality of storage areas. The method further includes obtaining a first write identifier of the first storage area, where the first write identifier indicates a size of space of stored data in the first storage area. The method further includes in response to determining that the size of the space of the stored data in the first storage area is equal to the size of the allocated space in the first storage area, reading first data in a first sub-area.

18 Claims, 12 Drawing Sheets

(56) References Cited

U.S. PATENT DOCUMENTS

| | | | | |
|---|---|---|---|---|
| 2010/0257310 | A1* | 10/2010 | Murase | G06F 13/1673 |
| | | | | 711/E12.001 |
| 2010/0312985 | A1* | 12/2010 | Rostedt | G06F 9/52 |
| | | | | 711/E12.078 |
| 2019/0236749 | A1* | 8/2019 | Gould | G06T 1/20 |
| 2020/0004460 | A1* | 1/2020 | Gould | G06F 3/0613 |
| 2020/0301765 | A1* | 9/2020 | Vary | G06F 9/52 |
| 2021/0089458 | A1* | 3/2021 | Fruchter | G06F 12/0871 |
| 2022/0327056 | A1* | 10/2022 | Jeffery | G06F 12/0844 |

OTHER PUBLICATIONS cnblogs.com [online], "Design and Implementation of Network Byte Stream Data Parsing Component—Circular Buffer (Ring Buffer)," Aug. 9, 2012, retrieved on Nov. 29, 2024, retrieved from URL<https://www.cnblogs.com/dskit/archive/2012/08/09/2631026.html>, 8 pages (with English Translation).

[No author listed] [online], "CppCon 2016: Fedor Pikus 'The speed of concurrency (is lock-free faster?),'" Oct. 6, 2016, Internet Archive: Wayback Machine URL<https://web.archive.org/web/20250116172220/https://www.youtube.com/watch?v=9hJkWwHDDxs>, retrieved on Jan. 16, 2025, retrieved from URL<https://www.youtube.com/watch?v=9hJKWwHDDxs> 23 pages (with Machine Transcript).

1 Extended European Search Report in European Appln. No. 22863077.8, mailed on May 22, 2024, 11 pages.

* cited by examiner

DATA PROCESSING METHOD, DATA PROCESSING APPARATUS, AND RELATED DEVICE

CROSS-REFERENCE TO RELATED APPLICATIONS

This application is a continuation of International Application No. PCT/CN2022/111739, filed on Aug. 11, 2022, which claims priority to Chinese Patent Application No. 202111015761.0, filed on Aug. 31, 2021. The disclosures of the aforementioned applications are hereby incorporated by reference in their entireties

TECHNICAL FIELD

This application relates to a computer field, and in particular, to a data processing method, a data processing apparatus, and a related device.

BACKGROUND

In an operating system, a circular storage queue is a special first in first out queue. The circular storage queue connects a last location to a first location in storage space to form logical ring space.

FIG. 1 is a schematic diagram of a structure of a circular storage queue. As shown in FIG. 1, the circular storage queue includes a corresponding global write pointer and a corresponding global read pointer. Along an anti-clockwise direction, an area between the global write pointer and the global read pointer is a storage area b, and an area between the global read pointer and the global write pointer is an area a. Data in the area a is to be read, and data in the area b is to be written. As data is written and read, the global write pointer and the global read pointer move along the anti-clockwise direction. For example, after a thread 1 is allocated to a sub-area b1, the global write pointer moves to a sub-area b2. After a thread 2 is allocated to the sub-area b2, the global write pointer moves to a remaining area b3. After data is written, different threads perform in-order commit. Specifically, after data is written into the sub-area b1, the thread 1 performs a commit operation. The commit operation indicates that the data is written into the sub-area b1. The data in the sub-area b1 can be read. Similarly, after data is written into the sub-area b2, the thread 2 performs a commit operation. The commit operation indicates that the data is written into the sub-area b2. The data in the sub-area b2 can be read. If different threads perform out-of-order commit, data reading is affected. Specifically, if the thread 2 performs the commit operation in advance, after the global read pointer moves to the sub-area b1, a thread may read the data in the sub-area b1. However, the thread 1 does not complete data writing. Therefore, the data read by the thread may be incorrect.

After the thread 2 writes the data, the thread 2 enters a waiting state until the thread 1 completes the commit operation. In a waiting period, the thread 2 needs to frequently determine whether the thread 1 completes the commit operation. As a result, system running efficiency is reduced.

SUMMARY

This application provides a data processing method, a data processing apparatus, and a related device. In this application, a first write identifier is added, so that out-of-order commit does not affect correctness of read data. Therefore, out-of-order commit can be used to improve system running efficiency in this application.

According to a first aspect, this application provides a data processing method. The data processing method may be applied to an operating system including a circular storage queue. The data processing method may be executed by a thread, an operating system, or a computer device on which an operating system is installed. The following describes the data processing method by using an example in which an execution entity is a computer device. The data processing method includes the following steps: The computer device obtains a first global read pointer of a circular storage queue. The circular storage queue includes M storage areas. Herein, M is an integer greater than 1. Each storage area is logically continuous. The first global read pointer points to a first storage area in the M storage areas. The computer device obtains a first write identifier of the first storage area. Each of the M storage areas corresponds to one write identifier. The first storage area corresponds to the first write identifier. The first write identifier indicates a size of space of stored data in the first storage area. The computer device determines a size of allocated space in the first storage area. The computer device may determine a commit status of the first storage area based on the first write identifier. The commit status includes completely committed and incompletely committed. Completely committed indicates that the size of the space of the stored data in the first storage area is equal to the size of the allocated space in the first storage area. Incompletely committed indicates that the size of the space of the stored data in the first storage area is less than the size of the allocated space in the first storage area. If a first condition is met, the computer device reads first data in the first sub-area. The first condition includes that the commit status of the first storage area is completely committed.

In this application, the first write identifier indicates a data size. Therefore, in the first storage area, out-of-order commit does not affect determining of the commit status. In other words, out-of-order commit does not affect correctness of read data. Therefore, after writing data into the first storage area, a thread may not need to wait for another thread to complete a commit operation, thereby improving system running efficiency.

In an optional manner of the first aspect, if a first global write pointer points to a storage area other than the first storage area, the computer device determines that the size of the allocated space in the first storage area is equal to a size of total space of the first storage area; and/or if the first global write pointer points to the first storage area, the computer device determines that the size of the allocated space in the first storage area is equal to a difference between a location of a first byte and a start location of the first storage area. The first global write pointer points to the first byte in the first storage area. The size of the allocated space in the first storage area may be alternatively recorded by using an additional identifier. In this application, the size of the allocated space in the first storage area is determined based on the first global write pointer, to improve utilization of the first global write pointer and save system storage space.

In an optional manner of the first aspect, before the reading first data in the first sub-area, the data processing method further includes: The computer device obtains a first read identifier of the first storage area. The first read identifier indicates a data size of read data in the first storage area. The computer device determines a value relationship between the first write identifier and the first read identifier.

The first condition further includes that the first write identifier is greater than the first read identifier. When the first write identifier is equal to the first read identifier, it indicates that unread data is not written into the first sub-area, and the computer device cannot read the first data. Therefore, the computer device may not need to determine the commit status of the first storage area, thereby saving system processing resources.

In an optional manner of the first aspect, a size of the first sub-area and a size of the first data each are X bytes. Herein, X is an integer greater than 0. After the reading first data in the first sub-area, the data processing method further includes: The computer device updates the first read identifier of the first storage area based on X. An updated first read identifier is equal to a sum of the first read identifier and X.

In an optional manner of the first aspect, the data processing method further includes: The computer device obtains a second global write pointer of the circular storage queue. The second global write pointer points to a second byte in the first storage area. A start location of the first sub-area is the second byte. The computer device writes the first data from the second byte if a difference between the location of the second byte and an end location of the first storage area is greater than or equal to X. The computer device does not write the first data from the second byte if a difference between the location of the second byte and an end location of the first storage area is less than X. The difference less than X indicates that remaining space of the first storage area is insufficient. When the remaining space of the first storage area is insufficient, the current thread can write only a part of the first data into the remaining space. The current thread further needs to write the other part of the first data into a first sub-area of a next storage area. In a multi-thread concurrency scenario, the first sub-area of the next storage area may not be allocated to the current thread. In this case, the other part of the first data cannot be written into the first sub-area, thereby reducing system reliability. If the difference is greater than or equal to X, it indicates that the first storage area has sufficient remaining space. The computer device writes the first data into the remaining space only when there is sufficient remaining space. Therefore, in this application, system reliability can be improved.

In an optional manner of the first aspect, the data processing method further includes: The computer device obtains a third global write pointer of the circular storage queue. The third global write pointer points to a third byte in the first storage area. The computer device obtains a size of to-be-written second data. The size of the second data is N bytes. If a location of the third byte and the end location of the first storage area indicate that the remaining area of the first storage area is less than N bytes, the computer device adds a target identifier to the remaining area. The target identifier indicates that the remaining area is an invalid sub-area. For example, the computer device may add the target identifier to a header of the remaining area. The target identifier is added, so that the computer device can be prevented from reading incorrect data. For example, the incorrect data may be data that is written in a previous cycle and read. Therefore, in this application, system reliability can be improved.

In an optional manner of the first aspect, before the reading first data in the first sub-area, the data processing method further includes: The computer device determines whether the first sub-area is an invalid sub-area. The first condition further includes that the first sub-area is not an invalid sub-area. If the first sub-area is an invalid sub-area, the computer device does not read the data in the first sub-area. System resources are wasted if the computer device reads the invalid data in the first sub-area. In this application, whether the first sub-area is an invalid sub-area is determined before the first data is read, thereby avoiding a waste of system resources.

In an optional manner of the first aspect, the data processing method further includes: If a second condition is met, the computer device updates the third global write pointer. An updated third global write pointer points to a second storage area. The second storage area is a next storage area of the first storage area. The second condition includes that the second storage area is not allocated; or the third global read pointer points to a storage area other than the second storage area, and a quotient obtained by dividing a second write identifier of the second storage area by a size of total space of the second storage area is equal to an integer. The second write identifier indicates a size of space of stored data in the second storage area. When the third global read pointer points to the storage area other than the second storage area, and the quotient obtained by dividing the second write identifier of the second storage area by the size of the total space of the second storage area is equal to the integer, it indicates that data in the second storage area is completely written in a final cycle. When the third global read pointer points to the second storage area, or the quotient obtained by dividing the second write identifier of the second storage area by the size of the total space of the second storage area is not equal to the integer, it indicates that data in the second storage area is not completely written in a previous cycle. When the data in the second storage area is not completely written, the computer device cannot update the third global write pointer. Otherwise, two threads may write data to a same byte at the same time, thereby causing a system exception. In this application, before the third global write pointer is updated, whether data in the second storage area is completely written is determined, so that system stability can be improved.

In an optional manner of the first aspect, before the computer device updates the third global write pointer, the data processing method further includes: The computer device resets the second write identifier. The first global read pointer includes a first area read pointer and a first area read offset pointer. The first area read pointer points to the first storage area. The first area read offset pointer points to the second byte in the first storage area. The first global write pointer includes a first area write pointer and a first area write offset pointer. After the computer device reads the first data in the first sub-area, the data processing method further includes: If a difference between the first area read pointer and the first area write pointer is greater than M, the computer device resets the first read identifier. To improve data writing efficiency, when the computer device writes data, unread data may be overwritten. When the first write identifier is equal to the first read identifier, the data in the first sub-area may be not read. Therefore, if the computer device still determines, based on a value relationship between the first read identifier and the first write identifier, whether to determine the commit status, a system exception may be caused. For example, data cannot be read. Therefore, system reliability can be improved through resetting in this application.

In an optional manner of the first aspect, the data processing method further includes: if the difference between the first area read pointer and the first area write pointer is greater than M, updating the first area read pointer. An updated first area read pointer is equal to a difference between the first area write pointer and Z. Herein, Z=M−1. If the difference is greater than M, it indicates that the data written into the first sub-area is overwritten when the data is not read. If the computer device still reads the data from the first sub-area, data from the first global write pointer to the first sub-area is lost. In this application, the first area read pointer is updated to a previous storage area before the first area write pointer, thereby maximally reducing a lost data volume and improving system reliability.

In an optional manner of the first aspect, the second condition further includes that a quotient obtained by dividing a second read identifier of the second storage area by the size of the total space of the second storage area is equal to an integer. The second read identifier indicates a data size of read data in the second storage area. When the quotient obtained by dividing the second read identifier by the size of the total space of the second storage area is equal to the integer, it indicates that the data in the second storage area is completely read in the previous cycle. When the quotient obtained by dividing the second read identifier by the size of the total space of the second storage area is not equal to the integer, it indicates that the data in the second storage area is no completely read in the previous cycle. Content of the second condition is added, so that the computer device can be prevented from overwriting unread data when writing the data, thereby reducing a data loss and improving system reliability.

According to a second aspect, this application provides a data processing apparatus. The data processing apparatus includes a first obtaining module, a second obtaining module, a processing module, and a reading module. The first obtaining module is configured to obtain a first global read pointer of a circular storage queue. The circular storage queue includes M storage areas. Herein, M is an integer greater than 1. The first global read pointer points to a first storage area in the M storage areas. The second obtaining module is configured to obtain a first write identifier of the first storage area. The first write identifier indicates a size of space of stored data in the first storage area. The processing module is configured to determine a size of allocated space in the first storage area. The reading module is configured to: if a first condition is met, read first data in a first sub-area. The first condition includes that the size of the space of the stored data in the first storage area is equal to the size of the allocated space in the first storage area.

In an optional manner of the second aspect, the processing module is configured to: if a first global write pointer points to a storage area other than the first storage area, determine that the size of the allocated space in the first storage area is equal to a size of total space of the first storage area; and/or the processing module is configured to: if the first global write pointer points to the first storage area, determine that the size of the allocated space in the first storage area is equal to a difference between a location of a first byte and a start location of the first storage area. The first global write pointer points to the first byte in the first storage area.

In an optional manner of the second aspect, the first obtaining module is further configured to obtain a first read identifier of the first storage area. The first read identifier indicates a data size of read data in the first storage area. The processing module is further configured to determine a value relationship between the first write identifier and the first read identifier. The first condition further includes that the first write identifier is greater than the first read identifier.

In an optional manner of the second aspect, the data processing apparatus further includes an updating module. A size of the first sub-area and a size of the first data each are X bytes. Herein, X is an integer greater than 0. The update module is configured to update the first read identifier of the first storage area based on X. An updated first read identifier is equal to a sum of the first read identifier and X.

In an optional manner of the second aspect, the first obtaining module is further configured to obtain a second global write pointer of the circular storage queue. The second global write pointer points to a second byte in the first storage area. A start location of the first storage area is the second byte. The data processing apparatus further includes a write module. The write module is configured to write the first data into the first sub-area if a difference between the location of the second byte and an end location of the first storage area is greater than or equal to X.

In an optional manner of the second aspect, the first obtaining module is further configured to obtain a third global write pointer of the circular storage queue. The third global write pointer points to a third byte in the first storage area. The first obtaining module is further configured to obtain a size of to-be-written second data. The size of the second data is N bytes. The data processing apparatus further includes an adding module. The adding module is configured to: if a location of the third byte and the end location of the first storage area indicate that a remaining area of the first storage area is less than N bytes, add a target identifier to the remaining area. The target identifier indicates that the remaining area is an invalid sub-area.

In an optional manner of the second aspect, the processing module is further configured to determine whether the first sub-area is an invalid sub-area. The first condition further includes that the first sub-area is not an invalid sub-area.

In an optional manner of the second aspect, the data processing apparatus further includes an updating module. The updating module is configured to: if a second condition is met, update the third global write pointer. An updated third global write pointer points to a first byte in a second storage area. The second storage area is a next storage area of the first storage area. The second condition includes that the second storage area is not allocated; or a third global read pointer points to a storage area other than the second storage area, and a quotient obtained by dividing a second write identifier of the second storage area by a size of total space of the second storage area is equal to an integer. The second write identifier indicates a size of space of stored data in the second storage area.

In an optional manner of the second aspect, the data processing apparatus further includes a resetting module. The resetting module is configured to reset the second write identifier. The first global read pointer includes a first area read pointer and a first area read offset pointer. The first area read pointer points to the first storage area. The first area read offset pointer points to the second byte in the first storage area. The first global write pointer includes a first area write pointer and a first area write offset pointer. The resetting module is further configured to: if a difference between the first area read pointer and the first area write pointer is greater than M, reset the first read identifier in the first storage area.

In an optional manner of the second aspect, the updating module is further configured to: if the difference between the first area read pointer and the first area write pointer is greater than M, update the first area read pointer. An updated first area read pointer is equal to a difference between the first area write pointer and Z. Herein, Z=M−1.

In an optional manner of the second aspect, the second condition further includes that a quotient obtained by dividing a second read identifier of the second storage area by the size of the total space of the second storage area is equal to an integer. The second read identifier indicates a data size of read data in the second storage area.

According to a third aspect, this application provides a computer device. The computer device includes a memory and a processor. The memory stores a first global read pointer of a circular storage queue. The circular storage queue includes M storage areas. Herein, M is an integer greater than 1. The first global read pointer points to a first storage area in the M storage areas. The memory further stores a first write identifier of the first storage area. The first write identifier indicates a size of space of stored data in the first storage area. The processor is configured to determine a size of allocated space in the first storage area. The processor is configured to: if a first condition is met, read first data in a first sub-area. The first condition includes that the size of the space of the stored data in the first storage area is equal to the size of the allocated space in the first storage area.

In an optional manner of the third aspect, the processor is configured to: if a first global write pointer points to a storage area other than the first storage area, determine that the size of the allocated space in the first storage area is equal to a size of total space of the first storage area; and/or the processor is configured to: if the first global write pointer points to the first storage area, determine that the size of the allocated space in the first storage area is equal to a difference between a location of a first byte and a start location of the first storage area. The first global write pointer points to the first byte in the first storage area.

In an optional manner of the third aspect, the processor is further configured to obtain a first read identifier of the first storage area. The first read identifier indicates a size of space of read data in the first storage area. The processor is further configured to determine a value relationship between the first write identifier and the first read identifier. The first condition further includes that the first write identifier is greater than the first read identifier.

In an optional manner of the third aspect, a size of the first sub-area and a size of the first data each are X bytes. Herein, X is an integer greater than 0. The processor is further configured to update the first read identifier of the first storage area based on X. An updated first read identifier is equal to a sum of the first read identifier and X.

In an optional manner of the third aspect, the processor is further configured to obtain a second global write pointer of the circular storage queue. The second global write pointer points to a second byte in the first storage area. The second byte is a start location of the first sub-area. The processor is further configured to write the first data into the first sub-area if a difference between the location of the second byte and an end location of the first storage area is greater than or equal to X.

In an optional manner of the third aspect, the processor is further configured to obtain a third global write pointer of the circular storage queue. The third global write pointer points to a third byte in the first storage area. The processor is further configured to obtain a size of to-be-written second data. The size of the second data is N bytes. The processor is further configured to: if a location of the third byte and the end location of the first storage area indicate that a remaining area of the first storage area is less than N bytes, add a target identifier to the remaining area. The target identifier indicates that the remaining area is an invalid sub-area.

In an optional manner of the third aspect, the processor is further configured to determine whether the first sub-area is an invalid sub-area. The first condition further includes that the first sub-area is not an invalid sub-area.

In an optional manner of the third aspect, the processor is further configured to: if a second condition is met, update the third global write pointer. An updated third global write pointer points to a first byte in a second storage area. The second storage area is a next storage area of the first storage area. The second condition includes that the second storage area is not allocated; or a third global read pointer points to a storage area other than the second storage area, and a quotient obtained by dividing a second write identifier of the second storage area by a size of total space of the second storage area is equal to an integer. The second write identifier indicates a size of space of stored data in the second storage area.

In an optional manner of the third aspect, the processor is further configured to reset the second write identifier. The first global read pointer includes a first area read pointer and a first area read offset pointer. The first area read pointer points to the first storage area. The first area read offset pointer points to the second byte in the first storage area. The first global write pointer includes a first area write pointer and a first area write offset pointer. The processor is further configured to: if a difference between the first area read pointer and the first area write pointer is greater than M, reset the first read identifier in the first storage area.

In an optional manner of the third aspect, the processor is further configured to: if the difference between the first area read pointer and the first area write pointer is greater than M, update the first area read pointer. An updated first area read pointer is equal to a difference between the first area write pointer and Z. Herein, Z=M−1.

In an optional manner of the third aspect, the second condition further includes that a quotient obtained by dividing a second read identifier of the second storage area by the size of the total space of the second storage area is equal to an integer. The second read identifier indicates a data size of read data in the second storage area.

According to a fourth aspect, this application provides a computer storage medium. The computer storage medium stores instructions. When the instructions are executed on a computer device, the computer device is enabled to perform the method according to the first aspect or any implementation of the first aspect.

According to a fifth aspect, this application provides a computer program product. When the computer program product is executed on a computer device, the computer device is enabled to perform the method according to the first aspect or any implementation of the first aspect.

DESCRIPTION OF EMBODIMENTS

Figure 1:
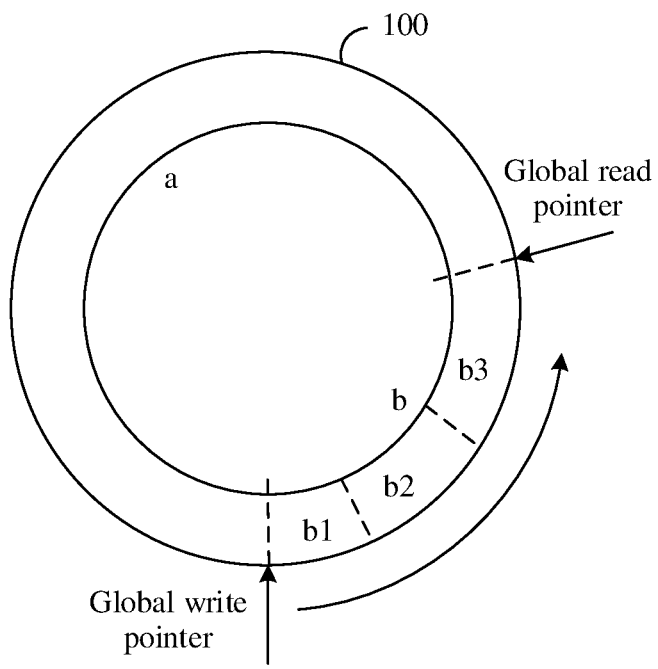
FIG. 1 is a schematic diagram of a structure of a circular storage queue.

This application provides a data processing method, a data processing apparatus, and a related device. In this application, a first write identifier is added, so that out-of-order commit does not affect correctness of read data. Therefore, out-of-order commit can be used to improve system running efficiency in this application. It should be understood that "first", "second", "target", and the like used in this application are merely used for distinction and description, and shall not be understood as an indication or implication of relative importance or an indication or implication of an order. In addition, for brevity and clarity, reference numerals and/or letters are repeated in a plurality of accompanying drawings of this application. Repetition does not indicate that there is a strict restrictive relationship between various embodiments and/or configurations.

The data processing method in this application may be applied to a computer field, for example, an operating system using a circular storage queue. In a circular storage queue shown in FIG. 1, different threads need to perform a commit operation in a specific order that is referred to as in-order commit for short. The specific order indicates a movement direction of a global write pointer and a global read pointer. For example, in FIG. 1, the specific order is an anti-clockwise direction. When in-order commit is used, a thread needs to wait for a previous thread to complete the commit operation even if the thread writes data first. In addition, in a waiting period, the thread needs to frequently determine whether the previous thread completes the commit operation, thereby reducing system running efficiency.

Figure 2:
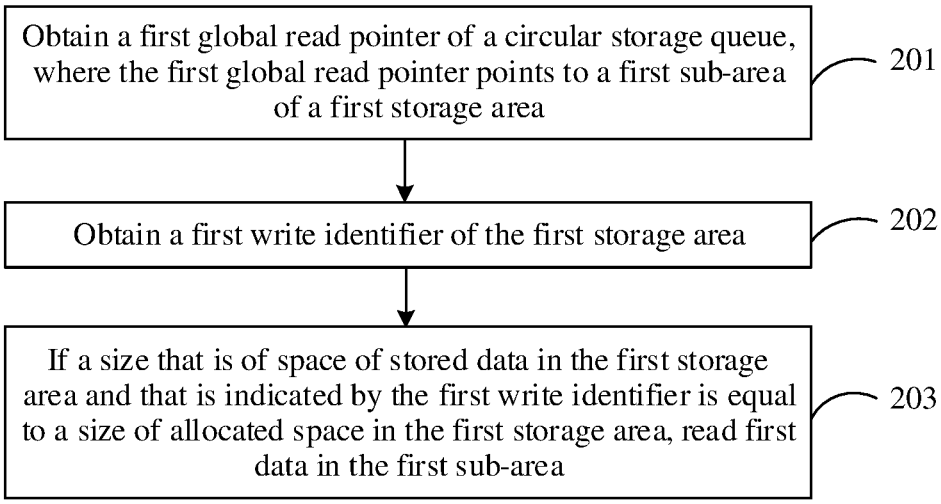
FIG. 2 is a schematic flowchart of a data processing method according to this application.

Therefore, this application provides a data processing method. FIG. 2 is a first schematic flowchart of a data processing method according to this application. As shown in FIG. 2, the data processing method includes the following steps.

In step 201, a computer device obtains a first global read pointer of a circular storage queue. The first global read pointer points to a first sub-area of the first storage area.

Figure 3:
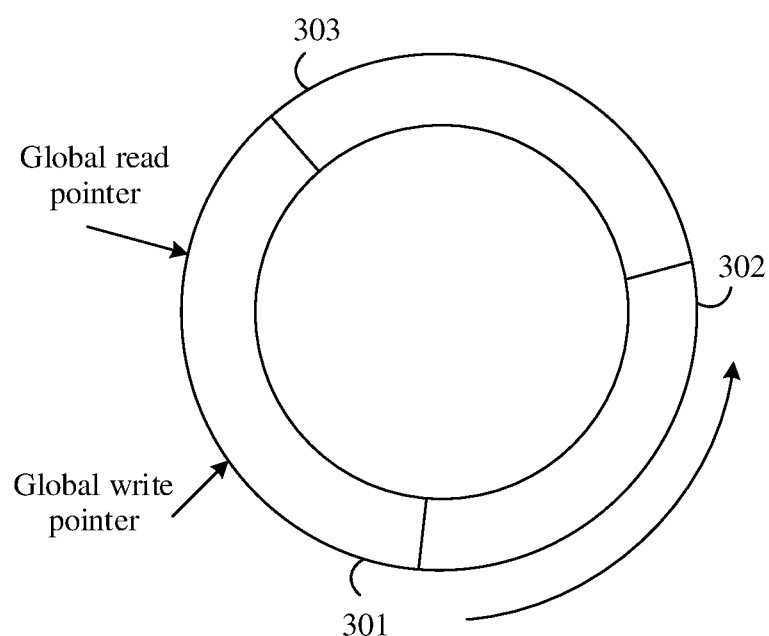
FIG. 3 is a first schematic diagram of a structure of a circular storage queue according to this application.

In the data processing method in this application, another type of circular storage queue is used. Specifically, the circular storage queue is divided into M logical storage areas. Herein, M is an integer greater than 1. Each storage area is logically continuous. Each storage area corresponds to one write identifier. A write identifier indicates a data size of stored data in a corresponding storage area. For example, FIG. 3 is a first schematic diagram of a structure of a circular storage queue according to this application. As shown in FIG. 3, the circular storage queue includes three storage areas. Space sizes of the three storage areas may be the same, or may be different. The three storage areas are respectively a storage area 301, a storage area 302, and a storage area 303. The three storage areas correspond to three write identifiers. The three storage areas are in a one-to-one correspondence with three write identifiers.

The circular storage queue further includes a corresponding global write pointer and a corresponding global read pointer. As data is written and read, locations of the global write pointer and the global read pointer continuously change along a logical direction. In FIG. 3, the logical direction is the anti-clockwise direction. It should be understood that, in actual application, the logical direction may be alternatively a clockwise direction. The circular storage queue is logical ring space. Therefore, the global write pointer or the global read pointer may cyclically pass through a same area. It can be learned from the foregoing description that, in time domain, the locations of the global write pointer and the global read pointer may continuously change. Therefore, for ease of description, in this application, the global write pointer and the global read pointer at different moments may have different names. For example, different names include a first global write pointer and a first global read pointer, a second global write pointer and a second global read pointer, and the like.

The computer device obtains the first global read pointer of the circular storage queue. The first global read pointer points to the first sub-area of the first storage area. Specifically, the first global read pointer may point to a start location of the first sub-area. The start location may be a first byte of the first sub-area. The first storage area is a storage area in the M storage areas. In a data writing process, the computer device writes data in a unit of a sub-area. For example, a size of total space of the storage area 301 is 100 bytes. The computer device allocates first 40 bytes to a thread 1. The computer device allocates following 60 bytes to a thread 2. The thread 1 writes data into the first 40 bytes. The thread 2 writes data into the following 60 bytes. In this case, the first 40 bytes and the following 60 bytes belong to different sub-areas. Each storage area may include one or more sub-areas. The first sub-area is any one of one or more sub-areas.

In step 202, the computer device obtains a first write identifier of the first storage area.

It can be learned from the foregoing description that each storage area corresponds to one write identifier. The first storage area corresponds to the first write identifier. The first write identifier indicates a size of space of stored data in the first storage area. It should be understood that, in this application, the size of the space of the stored data in the first storage area includes only a data size of data written by the computer device in a final cycle. Specifically, as data is written, the computer device cyclically allocates the storage space of the first storage area. For example, in a first cycle, the computer device allocates the first storage area to the thread 1 and the thread 2. In a second cycle, the computer device allocates the first storage area to the thread 1, a thread 3, and a thread 4. In the final cycle, the computer device allocates the first storage area to one or more threads. In the allocated storage space, one or more threads write data into the first storage area. The first write identifier indicates a data size of data written by the one or more threads in the first storage area in the final cycle. A value of the first write identifier changes with a commit operation of a thread. For example, the first storage area includes the first sub-area and a second sub-area. The first sub-area includes 40 bytes. The second sub-area includes 60 bytes. When the thread 1 and the thread 2 write no data, the value of the first write identifier may be 0 or a multiple of 100. It is assumed that the value of the first write identifier is 0. After the thread 1 writes data into the first sub-area, the thread 1 performs a commit operation. In this case, the first write identifier changes to 40. After the thread 1 writes data into the second sub-area, the thread 2 performs a commit operation. In this case, a second write identifier changes to 100.

In step 203, if the size that is of the space of the stored data in the first storage area and that is indicated by the first write identifier is equal to a size of allocated space in the first storage area, the computer device reads first data in the first sub-area.

The computer device may determine a commit status of the first storage area based on the first write identifier. The commit status includes completely committed and incompletely committed. Completely committed indicates that the size of the space of the stored data in the first storage area is equal to the size of the allocated space. Incompletely committed indicates that the size of the space of the stored data in the first storage area is less than the size of the allocated space. Before data is written into the first storage area, the computer device needs to allocate the storage space in the first storage area to the one or more threads. It can be learned from the foregoing description that the computer device cyclically writes the data into the first storage area. Therefore, the computer device cyclically allocates the storage space in the first storage space to the thread. It should be understood that, in this application, the size of the allocated space in the first storage area includes only a size of space allocated by the computer device in the final cycle.

In this application, the first write identifier indicates the size of the space of the stored data. If the size of the space of the stored data is equal to the size of the allocated space, the computer device reads the first data in the first sub-area. A size of the first sub-area and a size of the first data each are X bytes. Herein, X is an integer greater than 0. If the size of the space of the stored data is less than the size of the allocated space, the computer device does not read the data in the first sub-area. For example, it is assumed that the size of the allocated space in the first storage area is 100 bytes. First 40 bytes are allocated to the thread 1. Following 60 bytes are allocated to the thread 2. The first sub-area includes the first 40 bytes. After the thread 2 performs the commit operation, the following 60 bytes become the space of the stored data. In this case, the size of the allocated space is not equal to the size of the space of the stored data. The computer device does not read the data in the first sub-area. After the thread 1 performs the commit operation, the first 40 bytes become the space of the stored data. In this case, the size of the allocated space is 100 bytes. The size of the allocated space is equal to the size of the space of the stored data. The computer device reads the data in the first sub-area. Therefore, in the first storage area, out-of-order commit does not affect determining of the commit status. In other words, out-of-order commit does not affect correctness of read data. Therefore, after the thread 2 writes the data into the first storage area, the thread 2 may not need to wait for the thread 1 to complete the commit operation, thereby improving system running efficiency.

In actual application, the computer device may determine the size of the allocated space in the first storage area based on the first global write pointer. Specifically, if the first global write pointer points to a storage area other than the first storage area, the computer device determines that the size of the allocated space in the first storage area is equal to the size of the total space of the first storage area. If the first global write pointer points to the second sub-area of the first storage area, the computer device determines that the size of the allocated space in the first storage area is equal to a difference between a start location of the second sub-area and a start location of the first storage area. For example, the first storage area includes 200 bytes. The start location of the second sub-area is a $101^{st}$ byte in the 200 bytes. In this case, the computer device determines that the size of the allocated space is 100 bytes.

It can be learned from the foregoing description that each storage area in the circular storage queue corresponds to one write identifier. A write identifier indicates a size of space of stored data in a corresponding storage area. In actual application, each storage area may further correspond to one read identifier. The read identifier indicates a data size of read data in a corresponding storage area. For example, the first read identifier indicates a data size of read data in the first storage area. It can be learned from the foregoing description that the global read pointer continuously moves along the logical direction. Therefore, the global read pointer may cyclically pass through a same storage area. In other words, the computer device cyclically reads data from the same storage area. It should be understood that, in this application, the data size of the read data in the first storage area includes only a data size of data read by the computer device in the final cycle.

Before the computer device performs step 203, the computer device may determine a value relationship between the first write identifier and the first read identifier. When the first write identifier is equal to the first read identifier, it indicates that the data size of the read data in the first storage area is equal to the size of the space of the stored data. In this case, data is not written into the first sub-area. Therefore, the computer device does not need to perform step 203. When the first write identifier is less than the first read identifier, it indicates that the data size of the read data in the first storage area is less than the size of the space of the stored data. In this case, data is written into the first sub-area. Therefore, the computer device performs step 203.

It can be learned from the foregoing description that the first read identifier indicates the data size of the read data in the first storage area. Therefore, after reading the data in the first sub-area, the computer device may update the first read identifier. An updated first read identifier is equal to a sum of the first read identifier and X. Herein, X is a data size of the first data, or X is a space size of the first sub-area.

In the circular storage queue, the computer device writes and reads data in a unit of a sub-area. For example, in the foregoing description, the computer device reads the first data in the first sub-area. Therefore, before the computer device reads the first data, the computer device further writes the first data into the first sub-area. Specifically, the computer device obtains a second global write pointer of the circular storage queue. The second global write pointer points to a second byte in the first storage area. The second byte is a start location of the first sub-area. It should be understood that when data is written, the computer device may flexibly adjust the space size of the sub-area based on the data size of the first data. Therefore, quantities of sub-areas and space sizes in each storage area may be different in different cycles.

If the difference between the location of the second byte and the end location of the first storage area is greater than or equal to X, it indicates that remaining space of the first storage area is greater than the data size of the first data. Therefore, the computer device writes the first data from the second byte. If the difference between the location of the second byte and the end location of the first storage area is less than X, it indicates that remaining space of the first storage area is less than the data size of the first data. The computer device cannot write the first data into the remaining space.

When the remaining space is insufficient, the computer device may add a target identifier to the remaining space.

Figure 4A:
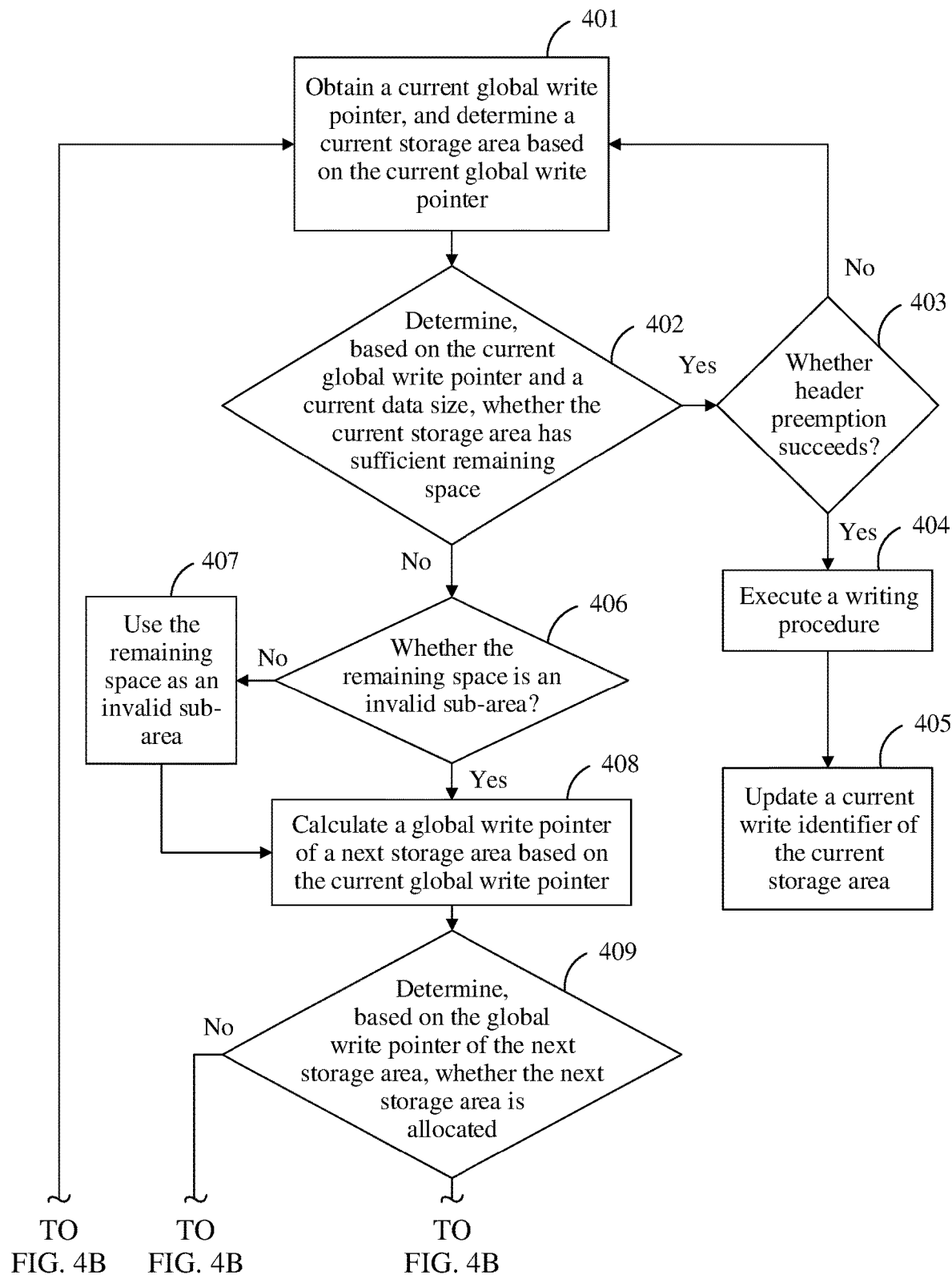
FIG. 4A and FIG. 4B are a first schematic flowchart of a data writing method according to this application.
Figure 4B:
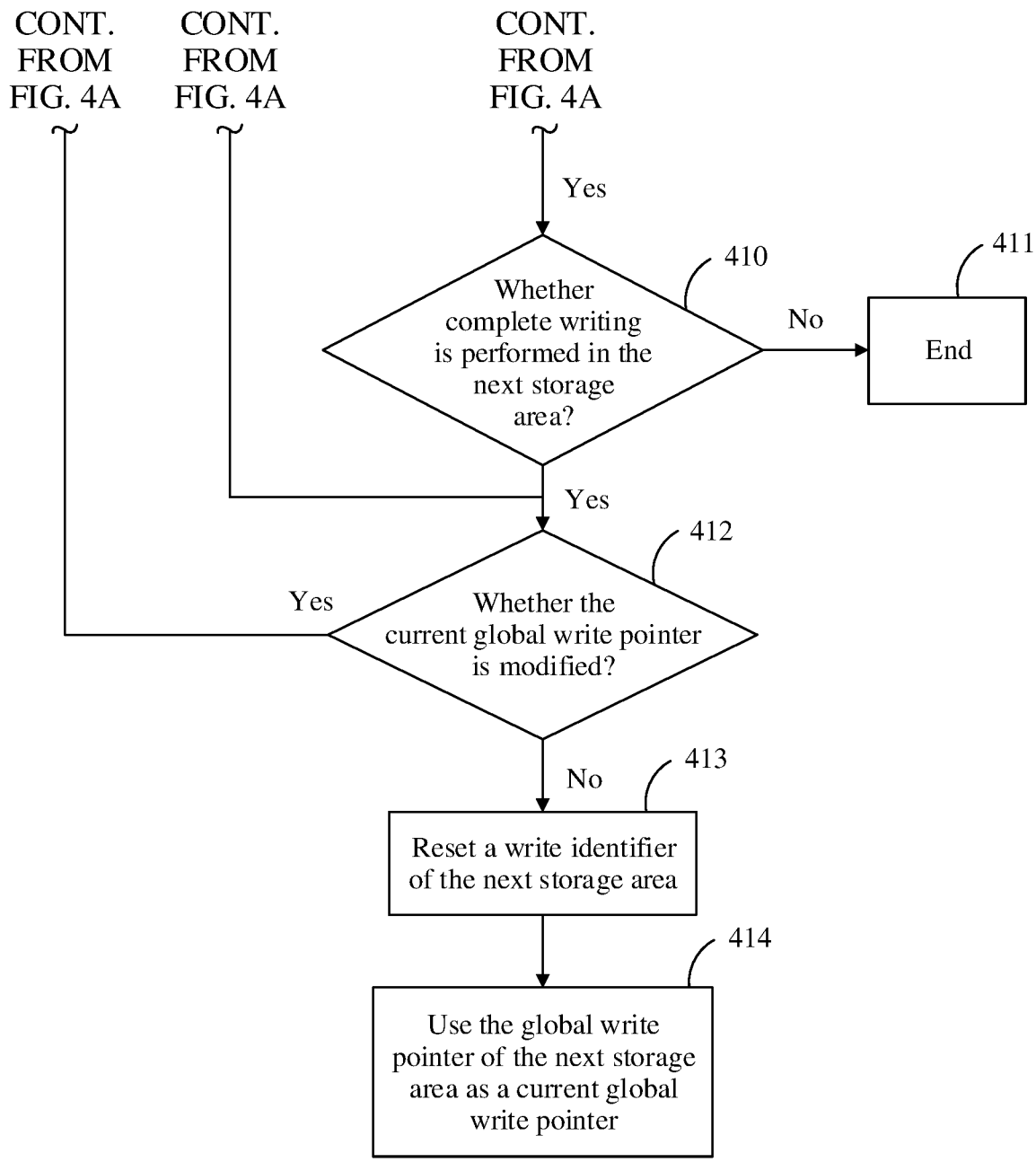

Before reading data, the computer device determines, based on the target identifier, whether to read data in the remaining space. Specifically, FIG. 4A and FIG. 4B are a first schematic flowchart of a data writing method according to this application. The data processing method in this application may be applied to data writing and reading in a circular storage queue. For ease of description, in this application, the data processing method is classified into a data writing method and a data reading method. The data writing method is associated with the data reading method. Therefore, descriptions of the two methods may be referenced to each other. As shown in FIG. 4A and FIG. 4B, the data writing method includes the following steps.

Figure 5:
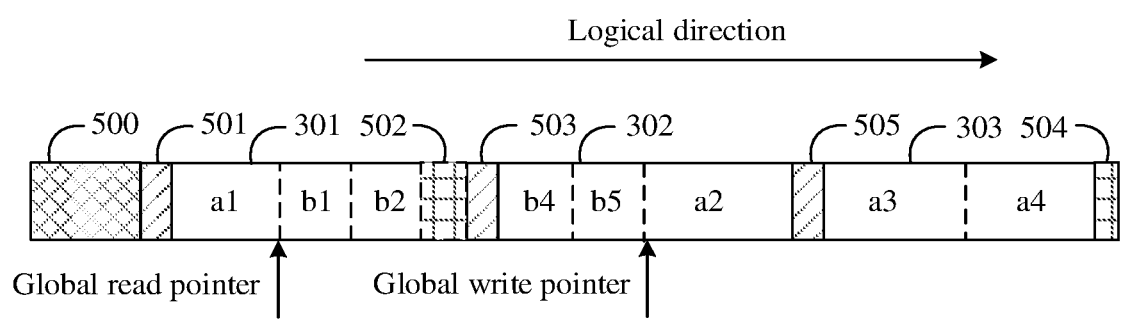
FIG. 5 is a second schematic diagram of a structure of a circular storage queue according to this application.

In step 401, a computer device obtains a current global write pointer, and determines a current storage area based on the current global write pointer. For a description of a circular storage queue, refer to the related description of FIG. 2 or FIG. 3. The computer device obtains the current global write pointer of the circular storage queue. The current global write pointer is also referred to as a present global write pointer. The current global write pointer points to a current storage area in M storage areas. The computer device may obtain the current global write pointer from a queue header of the circular storage queue. Specifically, FIG. 5 is a second schematic diagram of a structure of a circular storage queue according to this application. As shown in FIG. 5, the circular storage queue includes three storage areas. The three storage areas are respectively a storage area 301, a storage area 302, and a storage area 303. The storage area 301 includes a sub-area a1, a sub-area b1, a sub-area b2, and a target invalid sub-area 502. The storage area 302 includes a sub-area b4, a sub-area b5, and remaining space a2. The remaining space a2 may be allocated by the computer device to one or more threads. Therefore, the remaining space a2 may form a plurality of sub-areas. The storage area 303 includes a sub-area a3, a sub-area a4, and a target invalid sub-area 504. The circular storage queue further includes a queue header 500. The queue header 500 may be used to store a global write pointer and a global read pointer. In FIG. 5, the global write pointer points to the sub-area a2 in the storage area 302. The global read pointer points to the sub-area b1 in the storage area 301.

Each storage area may further include a corresponding area header. The area header is used to store a read identifier and/or a write identifier of a corresponding storage area. For example, the storage area 301 includes an area header 501. The area header 501 is used to store a write identifier and/or a read identifier of the storage area 301. Similarly, the storage area 302 includes an area header 503. The storage area 303 includes an area header 505.

Each storage area may further include a corresponding initial invalid sub-area (not shown in the figure). After space of the storage area is completely allocated, the global write pointer points to the initial invalid sub-area. After the space of the storage area is not completely allocated, the computer device combines remaining area of the storage area and the initial invalid sub-area to obtain an invalid sub-area. For example, the storage area 301 includes 100 bytes. An initial invalid sub-area includes 2 bytes. If the 100 bytes of the storage area 301 are completely allocated, the global write pointer points to the initial invalid sub-area of the storage area 301. The computer device uses the initial invalid sub-area as an invalid sub-area. After space of the storage area 301 is not completely allocated, the global write pointer points to remaining space of the storage area 301. If the remaining space is less than a size of to-be-written data, the computer device uses the remaining space as the target invalid sub-area. The computer device combines the target invalid sub-area and the initial invalid sub-area, to obtain the invalid sub-area. For example, if the 100 bytes of the storage area 301 are not completely allocated, the remaining space includes 10 bytes. If the remaining space of the 10 bytes is less than a data size of current data (to-be-written data), the computer device may use the 10 bytes as the target invalid sub-area. The computer device combines the target invalid sub-area and the initial invalid sub-area, to obtain the invalid sub-area. In this case, the invalid sub-area includes 12 bytes.

In step 402, the computer device determines, based on the current global write pointer and the current data size, whether the current storage area has sufficient remaining space. The current data size is a data size of current data to be written by a current thread. The current global write pointer points to a current byte in the current storage area. If a difference between an end location of the current storage area and the current byte is less than the current data size, it indicates that the current storage area does not have sufficient remaining space. If a difference between an end location of the current storage area and the current byte is greater than or equal to the data size of the current data, it indicates that the current storage area has sufficient remaining space. If there is sufficient remaining space, the computer device performs step 403. If there is no sufficient remaining space, the computer device performs step 406.

In step 403, the computer device determines whether head preemption succeeds. In a multi-thread concurrency scenario, a plurality of threads may contend for data writing. The computer device can write the current data from the current byte only after the current thread succeeds in head preemption. If the current thread succeeds in head preemption, the computer device performs step 404. If head preemption succeeds, it indicates that the computer device updates the current global write pointer. An updated current global write pointer points to following X bytes of the current byte. Herein, X indicates the size of the current data. Specifically, the computer device may update the current global write pointer by using an atomic operation. For example, the computer device may update the current global write pointer by using a compare-and-swap (CAS) technology. Similarly, in a subsequent operation of updating the global write pointer or the global read pointer in this application, the computer device may update the global write pointer or the global read pointer by using an atomic operation. If the current thread fails in head preemption, the computer device performs step 401. If the current thread fails in head preemption, another thread has modified the current global write pointer. Therefore, the computer device needs to perform step 401 again.

In step 404, the computer device performs a write procedure. After head preemption succeeds, the computer device writes the current data from the current byte. The data size of the current data is X bytes.

In step 405, the computer device updates the current write identifier of the current storage space. It can be learned from the foregoing description that the M storage areas are in a one-to-one correspondence with M write identifiers. The current write identifier corresponds to the current storage area. The current write identifier indicates a data size of stored data in the current storage area. After the computer device writes the current data into the current storage area, the computer device updates the current write identifier. The updated current write identifier is equal to a sum of the current write identifier and X.

It can be learned from the foregoing description that the computer device cyclically writes the data into the current storage area. Therefore, a value of the current write identifier may continuously increase. To save space for storing the current write identifier, the computer device may also continuously reset the current write identifier. Specifically, when the value of the current write identifier is equal to a size of total space of the current storage area, the computer device resets the current write identifier. For example, the size of the total space of the current storage area is 100 bytes. When the value of the current write identifier is equal to 100, the computer device sets the value of the current write identifier to 0.

In step 406, the computer device determines whether the remaining space is an invalid sub-area. The computer device may determine, based on the target identifier, whether the remaining space is an invalid sub-area.

For example, the target identifier is that all bits in the remaining space are 1. If all the bits in the remaining space are 1, the computer device determines that the remaining space is an invalid sub-area. If not all the bits in the remaining space are 1, the computer device determines that the remaining space is not an invalid sub-area.

For example, the target identifier is an identifier in a header of the remaining space. Specifically, for each sub-area, the computer device sets a corresponding head. After the computer device determines that there is insufficient remaining space, the computer device uses the remaining space as the target invalid sub-area. The computer device adds the target identifier to the header of the target invalid sub-area. Specific content of the target identifier may be a value of a bit. For example, when the value of the bit is 1, it indicates that the remaining space is an invalid sub-area. For example, when the value of the bit is 0, it indicates that the remaining space is not an invalid sub-area. If the remaining space is not an invalid sub-area, step 407 is performed. If the remaining space is an invalid sub-area, step 408 is performed. For a description of the invalid sub-area, refer to the description of step 401.

It can be learned from the foregoing description that, if storage space of the current storage area is completely allocated, the current global write pointer may point to the initial invalid sub-area corresponding to the current storage area. In this case, the current storage area does not have sufficient remaining space. The computer device determines the initial invalid sub-area as the invalid sub-area. The computer device performs step 408.

In step 407, the computer device uses the remaining space as the invalid sub-area. If the current storage area includes the initial invalid sub-area, the computer device combines the remaining space and the initial invalid sub-area, to obtain the invalid sub-area. If the current storage area does not include the initial invalid sub-area, the computer device uses the remaining space as the invalid sub-area. If the remaining space has no target identifier, the computer device adds the target identifier to the remaining space. For a description of the target identifier, refer to the description of step 406.

In step 408, the computer device calculates a global write pointer of a next storage area based on the current global write pointer. The next storage area is a storage area next to the current storage area in the logical direction. When the remaining space has the target identifier, the computer device calculates the global write pointer of the next storage area based on the current global write pointer. The global write pointer of the next storage area points to the next storage area. For example, the global write pointer of the next storage area points to a start location of the next storage area. It should be understood that, in this case, the computer device has not modified the current global write pointer.

In step 409, the computer device determines, based on the global write pointer of the next storage area, whether the next storage area is not allocated. Specifically, based on different formats of the global write pointer of the next storage area, the computer device may determine, in different manners, whether the next storage area is allocated.

For example, the global write pointer of the next storage area records a size of total allocated space of the circular storage queue. In this case, if the global write pointer of the next storage area is greater than the size of the total space of the circular storage queue, the computer device determines that the next storage area is allocated. If the global write pointer of the next storage area is less than or equal to the size of the total space of the circular storage queue, the computer device determines that the next storage area is not allocated. For example, the circular storage queue includes 10 storage areas. Each storage area includes 100 bytes. After each cycle, the computer device does not reset the global write pointer. In this case, if the global write pointer of the next storage area is greater than 1000, the computer device determines that the next storage area is allocated. If the global write pointer of the next storage area is less than 1000, the computer device determines that the next storage area is not allocated.

Figure 6:
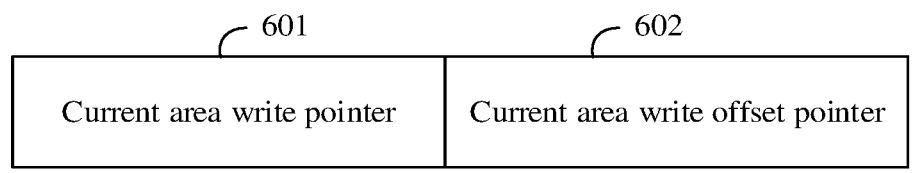
FIG. 6 is a schematic diagram of a structure of a global write pointer according to this application.

For example, FIG. 6 is a schematic diagram of a structure of a global write pointer according to this application. As shown in FIG. 6, the current global write pointer includes a current area write pointer 601 and a current area write offset pointer 602. The current area write pointer 601 indicates the current storage area. It is assumed that the circular storage queue includes 10 storage areas. The computer device writes data from a first storage area in the 10 storage areas. When the current area write pointer 601 is 1, it indicates that the current storage area is the first storage area in the 10 storage areas. When the current area write pointer 601 is 2, it indicates that the current storage area is a second storage area in the 10 storage areas. If the computer device does not reset the current area write pointer, the current area write pointer 601 gradually becomes greater than 10 as a quantity of cycles increases. For example, when the current area write pointer 601 is 11, it indicates that the current storage area is the first storage area in the 10 storage areas. When the current area write pointer 601 is 12, it indicates that the current storage area is the second storage area in the 10 storage areas. The global write pointer of the next storage area is referred to as a next global write pointer for short. If the area write pointer of the next global write pointer is greater than the quantity M of storage areas, the computer device determines that the next storage area is allocated. If the area write pointer of the next global write pointer is less than or equal to the quantity M of storage areas, the computer device determines that the next storage area is not allocated. If the next storage area is allocated, the computer device performs step 410. If the next storage area is not allocated, the computer device performs step 412.

The current area write offset pointer 602 indicates an offset of the current byte to a start location of the current storage area. It is assumed that the current storage area includes 100 bytes. The 100 bytes are sorted along the logical direction. When the current area write offset pointer 602 is equal to 5, it indicates that the current byte is a fifth byte in the 100 bytes. When the current area write offset pointer 602 is equal to 6, it indicates that the current byte is a sixth byte in the 100 bytes. If the computer device does not reset the current area write offset pointer 602, the current area write offset pointer 602 gradually becomes greater than 100 as a quantity of cycles increases. For example, when the current area write offset pointer 602 is equal to 105, it indicates that the current byte is the fifth byte in the 100 bytes. In one example, the current global write pointer includes 64 bits. The current area write pointer 601 includes first 48 bits in the 64 bits. The current area write offset pointer 602 includes following 16 bits in the 64 bits.

In step 410, the computer device determines whether complete writing is performed in the next storage area. It can be learned from the foregoing description of the circular storage queue that each storage area corresponds to one write identifier. Therefore, the next storage area corresponds to a next write identifier. The computer device may obtain the next write identifier. The next write identifier indicates a data size of stored data in a final cycle. For example, it is assumed that the next storage area includes 100 bytes. When the next write identifier is equal to 40, it indicates that the data size of the stored data in the next storage area in the final cycle is 40 bytes. It should be understood that, if the computer device does not reset the next write identifier, a value of the next write identifier gradually becomes greater than a size of total space of the next storage area as a quantity of cycles increases. For example, when the next write identifier is equal to 140, it indicates that the stored data in the next storage area in the final cycle is 40 bytes.

If a quotient obtained by dividing the next write identifier by the size of the total space of the next storage area is equal to an integer, the computer device determines that complete writing is performed in the next storage area. For example, the size of the total space of the next storage area is 100 bytes. When the next write identifier is equal to 200, the computer device determines that complete writing is performed in the next storage area. If a quotient obtained by dividing the next write identifier by the size of the total space of the next storage area is not equal to an integer, the computer device determines that complete writing is not performed in the next storage area. For example, the size of the total space of the next storage area is 100 bytes. When the next write identifier is equal to 205, the computer device determines that complete writing is not performed in the next storage area. If complete writing is not performed in the next storage area, the computer device performs step 411. If complete writing is performed in the next storage area, the computer device performs step 412.

After the final cycle, if 100 bytes are allocated, no commit operation is performed on the 100 bytes. In this case, complete writing is not performed in the next storage area. However, the quotient obtained by dividing the next write identifier by the size of the total space of the next storage area may still be equal to the integer. Therefore, to avoid this case, the computer device may obtain the current global read pointer. If the current global read pointer points to a storage area other than the next storage area, and the quotient obtained by dividing the next write identifier by the size of the total space of the next storage area is equal to the integer, the computer device determines that complete writing is performed in the next storage area. If the current global read pointer points to the next storage area, or the quotient obtained by dividing the write identifier of the next storage area by the size of the total space of the next storage area is not equal to the integer, the computer device determines that complete writing is not performed in the next storage area.

In step 411, the procedure ends. The ending may indicate that the current thread of the computer device quits storing the current data, or the current thread of the computer device returns to step 401.

In step 412, the computer device determines whether the current global write pointer is modified. In step 401, the computer device obtains the current global write pointer. In the multi-thread concurrency scenario, another thread may have modified the current global write pointer. For example, the another thread completes subsequent step 414. Therefore, the computer device obtains a current global write pointer herein again. If the current global write pointers obtained twice are the same, the computer device determines that the current global write pointer is not modified. If the current global write pointers obtained twice are different, the computer device determines that the current global write pointer is not modified. If the current global write pointer is not modified, step 413 is performed. If the current global write pointer is modified, step 401 is performed.

In step 413, the computer device resets the write identifier of the next storage area. The next storage area corresponds to the next write identifier.

In step 414, the computer device uses the global write pointer of the next storage area as the current global write pointer.

It should be understood that, for ease of description, in the flowchart in FIG. 4A and FIG. 4B, the current global write pointer, the current write identifier, the current storage area, the current global read pointer, and the like are used for description. In actual application, "current" may be changed to description such as "first", "second", or "third". For example, the current global write pointer may be a first global write pointer, a second global write pointer, or a third global write pointer. For example, the current storage area may be a first storage area or a second storage area.

Figure 7A:
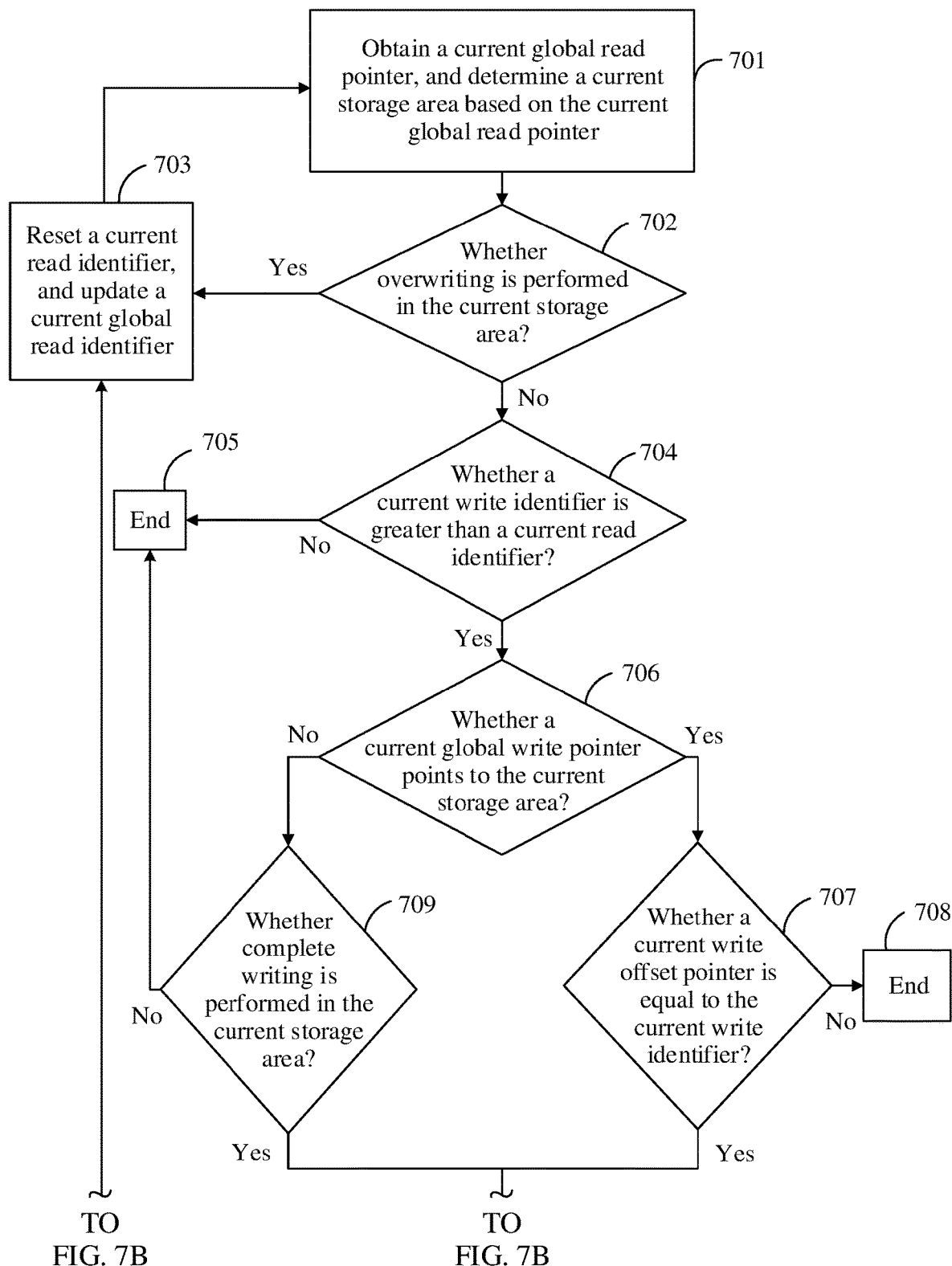
FIG. 7A and FIG. 7B are a first schematic flowchart of a data reading method according to this application.
Figure 7B:
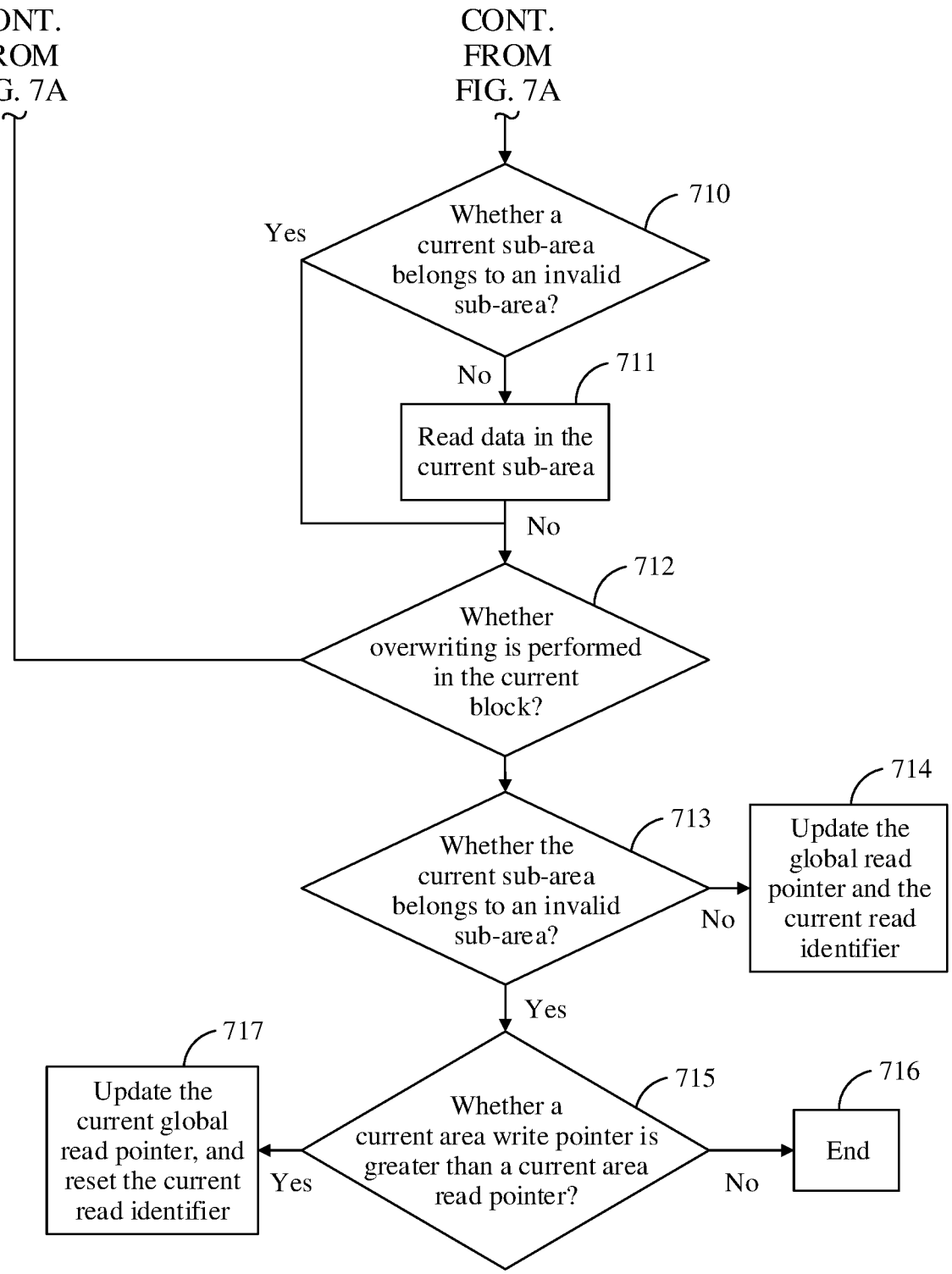

The foregoing describes the data writing method in this application. The following describes a data reading method in this application. Specifically, FIG. 7A and FIG. 7B are a first schematic flowchart of a data reading method according to this application. As shown in FIG. 7A and FIG. 7B, data writing includes the following steps.

In step 701, a computer device obtains a current global read pointer, and determines a current storage area based on the current global read pointer. For a description of a circular storage queue, refer to the related description of FIG. 2 to FIG. 4B. A current thread of the computer device obtains the current global read pointer of the circular storage queue. The current global read pointer is also referred to as a present global read pointer. The current global read pointer points to a current sub-area of a current storage area in M storage areas. For example, the current global read pointer points to a start location of the current sub-area. The start location is a current byte. The computer device may obtain the current global read pointer from a queue header of the circular storage queue.

In step 702, the computer device determines whether overwriting is performed in the current storage area. It can be learned from the foregoing description of FIG. 4A and FIG. 4B that a current global write pointer includes a current area write pointer and a current area write offset pointer. Similarly, the current global read pointer may include a current area read pointer and a current area read offset pointer. The current area read pointer indicates the current storage area. The current area read offset pointer indicates an offset of the current byte to a start location of the current storage area. For descriptions of the current area read pointer and the current area read offset pointer, refer to the related description of the current area write pointer and the current area write offset pointer. It should be understood that the current storage area to which the current global write pointer points and the current storage area to which the current global read pointer points may be a same storage area, or may be different areas. If a difference between the current area write pointer and the current area read pointer is greater than M, the computer device determines that overwriting is performed in the current storage area. If a difference between the current area write pointer and the current area read pointer is less than or equal to M, the computer device determines that overwriting is not performed in the current storage area. If overwriting is not performed in the current storage area, step 704 is performed. If overwriting is performed in the current storage area, step 703 is performed.

In step 703, the computer device resets a current read identifier. The computer device updates the current global read pointer.

The current storage area corresponds to a current write identifier and the current read identifier. To improve data writing efficiency, when writing data, the computer device may overwrite unread data. In this case, the current read identifier of the computer device cannot be normally updated. The computer device cannot determine, based on subsequent step 704, whether to perform step 706. Therefore, in step 413 in FIG. 4B, the computer device resets the current write identifier. In this step, the computer device resets the current read identifier.

If the difference between the current area read pointer and the current area write pointer is greater than M, it indicates that overwriting is performed in the current storage area. If the computer device still reads data from the current byte, data between the current global write pointer and the current byte is lost. Therefore, the computer device updates the current global read pointer. An updated current area read pointer is equal to a difference between the current area write pointer and Z. Herein, Z=M−1.

In step 704, the computer device determines whether the current write identifier is greater than the current read identifier. If the current write identifier is greater than the current read identifier, it indicates that unread data is written into the current sub-area, and the computer device can read the data in the current sub-area. If the current write identifier is less than or equal to the current read identifier, it indicates that no unread data is written into the current sub-area, and the computer device cannot read the data in the current sub-area. Therefore, if the current write identifier is equal to the current read identifier, the computer device performs step 705. If the current write identifier is greater than the current read identifier, the computer device performs step 706.

In step 705, the procedure ends. The ending may indicate that the current thread of the computer device quits storing the current data, or the current thread of the computer device returns to step 701.

In step 706, the computer device determines whether the current global write pointer points to the current storage area. For a description of the current global write pointer, refer to the description of the current global write pointer in FIG. 4A and FIG. 4B. For example, the current global write pointer includes the current area write pointer and the current area write offset pointer. It is assumed that the circular storage queue includes 10 storage areas. The current storage area is a first storage area in the 10 storage areas. When a remainder obtained by dividing the current area write pointer by 10 is equal to 1, it indicates that the current global write pointer points to the current storage area. For example, the current area write pointer is equal to 1, 11, or 21. When a remainder obtained by dividing the current area write pointer by 10 is not equal to 1, it indicates that the current global write pointer does not point to the current storage area. For example, the current area write pointer is equal to 3, 4, or 23. When the current global write pointer points to the current storage area, the computer device performs step 707. When the current global write pointer does not point to the current storage area, the computer device performs step 709.

In step 707, the computer device determines whether the current area write offset pointer of the current global write pointer is equal to the current write identifier. If the current area write offset pointer is not equal to the current write identifier, it indicates that a commit status of the current storage area is incompletely committed. If the current area write offset pointer is equal to the current write identifier, it indicates that a commit status of the current storage area is completely committed. For a description of the commit status, refer to the related description of FIG. 2. Therefore, if the current area write offset pointer is not equal to the current write identifier, the computer device performs step 708. If the current area write offset pointer is equal to the current write identifier, the computer device performs step 710. The current area write offset pointer points to a first byte in the current storage area. The first byte is any byte other than the current byte in the current storage area.

In step 708, the procedure ends. The ending may indicate that the current thread of the computer device quits storing the current data, or the current thread of the computer device returns to step 701.

In step 709, the computer device determines whether complete writing is performed in the current storage area. If a quotient obtained by dividing the current write identifier by a size of total space of the current storage area is equal to an integer, the computer device determines that complete writing is performed in the current storage area. For example, the size of the total space of the current storage area is 100 bytes. When the current write identifier is equal to 200, the computer device determines that complete writing is performed in the current storage area. If a quotient obtained by dividing the current write identifier by a size of total space of the current storage area is not equal to an integer, the computer device determines that complete writing is not performed in the current storage area. For example, the size of the total space of the current storage area is 100 bytes. When the current write identifier is equal to 205, the computer device determines that complete writing is not performed in the current storage area. If complete writing is not performed in the current storage area, it indicates that a commit operation is not performed on space in the current storage area in a final cycle. If complete writing is performed in the current storage area, it indicates that a commit operation is performed on all space in the current storage area in a final cycle. Therefore, if complete writing is not performed in the current storage area, the computer device performs step 705. If complete writing is performed in the current storage area, the computer device performs step 710.

In step 710, the computer device determines whether the current sub-area belongs to an invalid sub-area. It can be learned from the foregoing description that the current global read pointer points to the current sub-area. If the current sub-area does not belong to an invalid sub-area, the computer device performs step 711. If the current sub-area belongs to an invalid sub-area, step 712 is performed. For a description of the invalid sub-area, refer to the related description of FIG. 4A and FIG. 4B. For example, the computer device may determine, based on a target identifier, whether the current sub-area belongs to an invalid sub-area. If the current sub-area includes the corresponding target identifier, the computer device determines that the current sub-area belongs to an invalid sub-area. If the current sub-area does not include the corresponding target identifier, the computer device determines that the current sub-area does not belong to an invalid sub-area.

In step 711, the computer device reads the current data in the current sub-area.

In step 712, the computer device determines whether overwriting is performed in the current storage area. If the current global write pointer moves, overwriting may be performed in the current storage area. Therefore, the computer device determines again whether overwriting is performed in the current storage area. Specifically, the computer device obtains the current area write pointer and the current area write pointer. If the difference between the current area write pointer and the current area read pointer is greater than M, the computer device determines that overwriting is performed in the current storage area. If the difference between the current area write pointer and the current area read pointer is less than or equal to M, the computer device determines that overwriting is not performed in the current storage area. If overwriting is not performed in the current storage area, the computer device performs step 713. If overwriting is performed in the current storage area, the computer device performs step 703.

In step 713, the computer device determines whether the current sub-area belongs to an invalid sub-area. If the current sub-area belongs to an invalid sub-area, step 715 is performed. If the current sub-area does not belong to an invalid sub-area, step 714 is performed.

In step 714, the computer device updates the global read pointer and the current read identifier. An updated current global read pointer points to a next sub-area of the current sub-area. An updated current read identifier is equal to a sum of the current read identifier and X. Herein, X is a data size of the current data read by the computer device.

In step 715, the computer device determines whether the current area write pointer is greater than the current area read pointer. If the current area write pointer is greater than the current area read pointer, the computer device performs step 717. If the current area write pointer is less than or equal to the current area read pointer, the computer device performs step 716.

In step 716, the procedure ends. The ending may indicate that the current thread of the computer device quits storing the current data, or the current thread of the computer device returns to step 701.

In step 717, the computer device updates the current global read pointer. The computer device resets the current read identifier. An updated current global read pointer points to a next storage area of the current storage area. Specifically, the updated current global read pointer points to a first sub-area of the next storage area.

It should be understood that, for ease of description, in the flowchart in FIG. 7A and FIG. 7B, the current global write pointer, the current write identifier, the current storage area, the current global read pointer, and the like are used for description. In actual application, "current" may be changed to description such as "first", "second", or "third". For example, the current global read pointer may be a first global read pointer, a second global read pointer, or the like. For example, the current storage area may be a first storage area or a second storage area.

It should be understood that in the foregoing description of FIG. 4A and FIG. 4B, the current global write pointer corresponds to the current storage area. In the foregoing description of FIG. 7A and FIG. 7B, the current global read pointer corresponds to the current storage area. The two current storage areas may be a same storage area, or may be different storage areas.

It should be understood that FIG. 4A and FIG. 4B are a flowchart of a data writing method, and FIG. 7A and FIG. 7B are a flowchart of a data reading method. In the circular storage queue, data writing and data reading are associated with each other. Therefore, for the description of FIG. 7A and FIG. 7B, refer to the description of FIG. 4A and FIG. 4B. For the description of FIG. 4A and FIG. 4B, refer to the description of FIG. 7A and FIG. 7B.

In actual application, each storage area may further include a corresponding write area identifier and a corresponding read area identifier. For example, the current storage area corresponds to a current write area identifier and a current read area identifier. The current write area identifier is equal to the current area write pointer. The current write area identifier and the current write identifier may be recorded in one field. For example, one field includes 64 bits. The current write area identifier includes first 48 bits in the 64 bits. The current write identifier includes following 16 bits in the 64 bits. Similarly, the current read area identifier is equal to the current area read pointer. The current read area identifier and the current read identifier may be recorded in one field. For example, one field includes 64 bits. The current read area identifier includes first 48 bits in the 64 bits. The current read identifier includes following 16 bits in the 64 bits. The current write area identifier and the current read area identifier may be used to avoid an ABA problem in CAS.

Figure 8A:
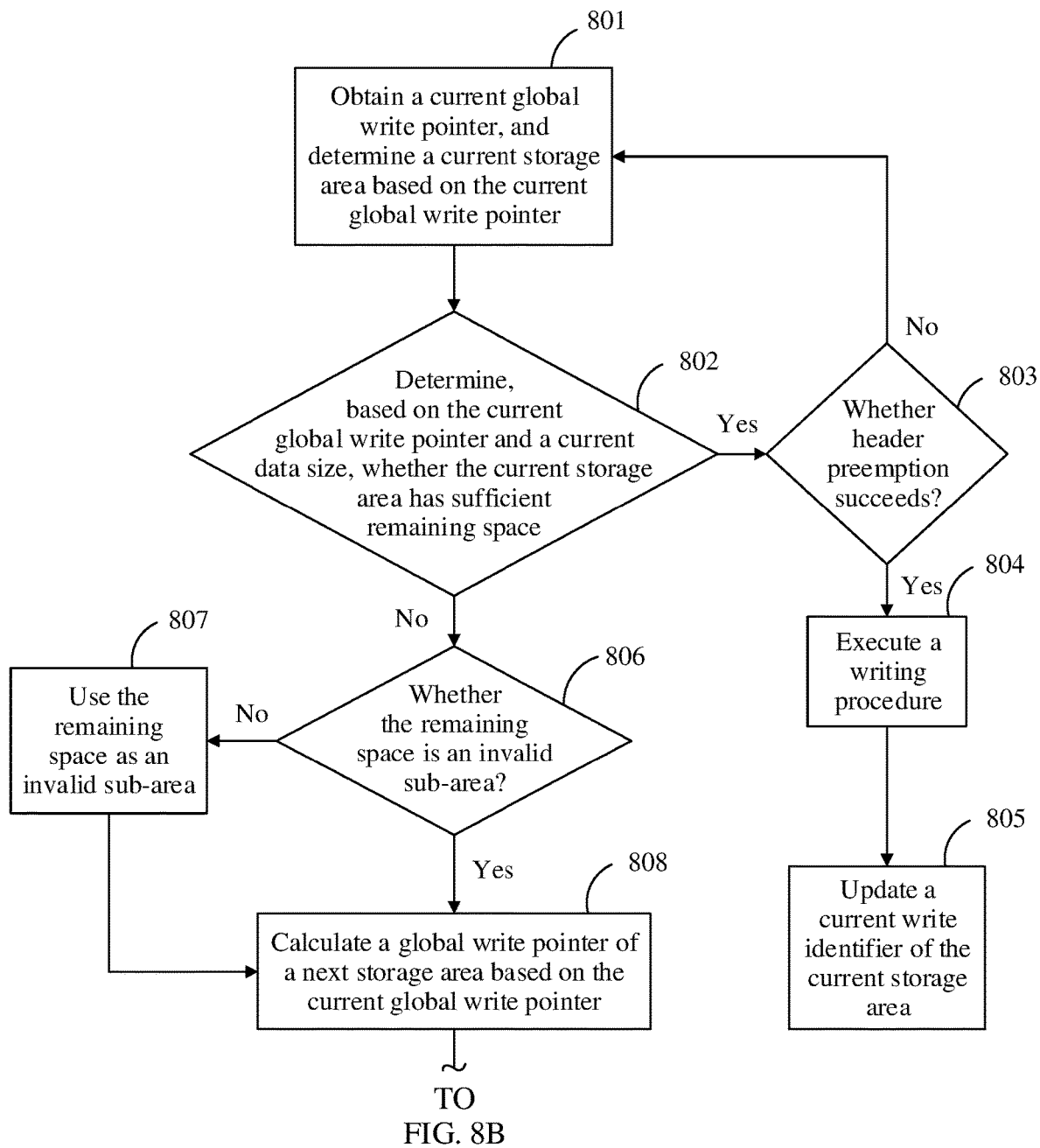
FIG. 8A and FIG. 8B are a second schematic flowchart of a data writing method according to this application.
Figure 8B:
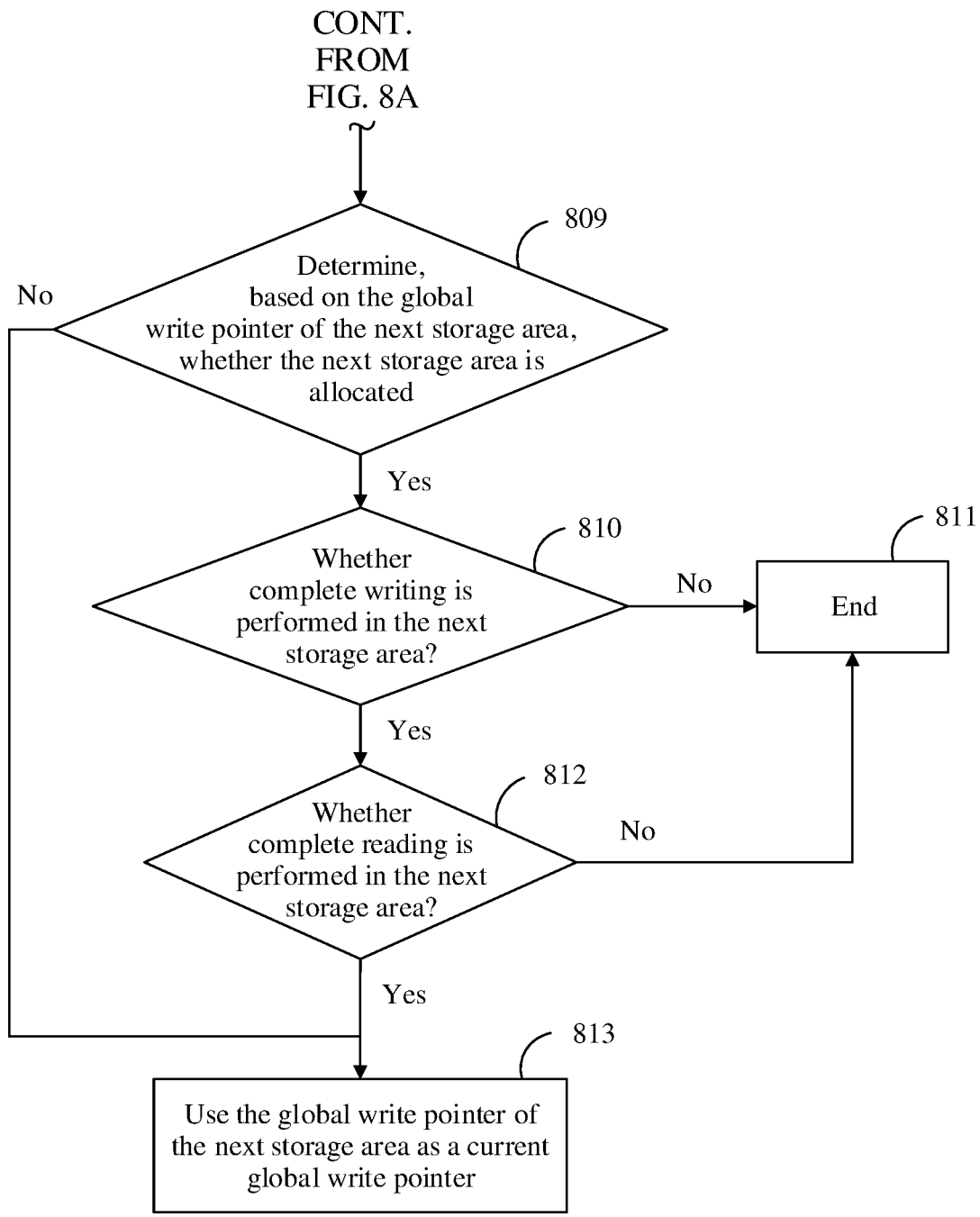

In the data writing method in FIG. 4A and FIG. 4B, the computer device may overwrite unread data, thereby causing a data loss. In some scenarios, the data loss may cause serious consequences. Therefore, this application provides another data writing method. In this method, the computer device does not overwrite unread data. Specifically, FIG. 8A and FIG. 8B are a second schematic flowchart of a data writing method according to this application. As shown in FIG. 8A and FIG. 8B, the data writing method includes the following steps.

In step 801, a computer device obtains a current global write pointer, and determines a current storage area based on the current global write pointer.

In step 802, the computer device determines, based on the current global write pointer and the current data size, whether the current storage area has sufficient remaining space. If there is sufficient remaining space, the computer device performs step 803. If there is no sufficient remaining space, the computer device performs step 806.

In step 803, the computer device determines whether head preemption succeeds. If the head preemption succeeds, the computer device performs step 804. If the head preemption fails, the computer device performs step 801.

In step 804, the computer device performs a write procedure.

In step 805, the computer device updates a current write identifier of current storage space.

In step 806, the computer device determines whether remaining space is an invalid sub-area. If the remaining space is not an invalid sub-area, step 807 is performed. If the remaining space is an invalid sub-area, step 808 is performed.

In step 807, the computer device uses the remaining space as an invalid sub-area.

In step 808, the computer device calculates a global write pointer of a next storage area based on the current global write pointer.

In step 809, the computer device determines, based on the global write pointer of the next storage area, whether the next storage area is not allocated. If the next storage area is allocated, the computer device performs step 810. If the next storage area is not allocated, the computer device performs step 812.

In step 810, the computer device determines whether complete writing is performed in the next storage area. If complete writing is not performed in the next storage area, the computer device performs step 811. If complete writing is performed in the next storage area, the computer device performs step 812.

In step 811, the procedure ends.

In step 812, the computer device determines whether completely reading is performed in the next storage area. It can be learned from the foregoing description of the circular storage queue that each storage area corresponds to one read identifier. Therefore, the next storage area corresponds to a next read identifier. The computer device may obtain the next read identifier. The next read identifier indicates a data size of read data in the next storage area in a final cycle. For example, it is assumed that the next storage area includes 100 bytes. When the next read identifier is equal to 40, it indicates that the data size of the read data in the next storage area in the final cycle is 40 bytes. It should be understood that, if the computer device does not reset the next read identifier, a value of the next read identifier gradually becomes greater than a size of total space of the next storage area as a quantity of cycles increases. For example, when the next read identifier is equal to 140, it indicates that the data size of the read data in the next storage area in the final cycle is 40 bytes.

If a quotient obtained by dividing the next read identifier by the size of the total space of the next storage area is equal to an integer, the computer device determines that completely reading is performed in the next storage area. For example, the size of the total space of the next storage area is 100 bytes. When the next read identifier is equal to 200, the computer device determines that completely reading is performed in the next storage area. If a quotient obtained by dividing the next read identifier by the size of the total space of the next storage area is not equal to an integer, the computer device determines that completely reading is not performed in the next storage area. For example, the size of the total space of the next storage area is 100 bytes. When the next read identifier is equal to 205, the computer device determines that completely reading is not performed in the next storage area. If completely reading is not performed in the next storage area, the computer device performs step 811. If completely reading is performed in the next storage area, the computer device performs step 813.

In step 813, the computer device uses the global write pointer of the next storage area as the current global write pointer.

It should be understood that FIG. 8A and FIG. 8B, and FIG. 4A and FIG. 4B have similar steps. Therefore, for a description of FIG. 8A and FIG. 8B, refer to the description of FIG. 4A and FIG. 4B. For example, for descriptions of step 801 to step 811, refer to step 401 to step 411 in FIG. 4A and FIG. 4B. For a description of step 813, refer to the description of step 414. In addition, there is no strict time sequence restriction between step 812 and step 810. For example, the computer device may first perform step 812. If completely reading is performed in the next storage area, the computer device performs step 810.

Figure 9A:
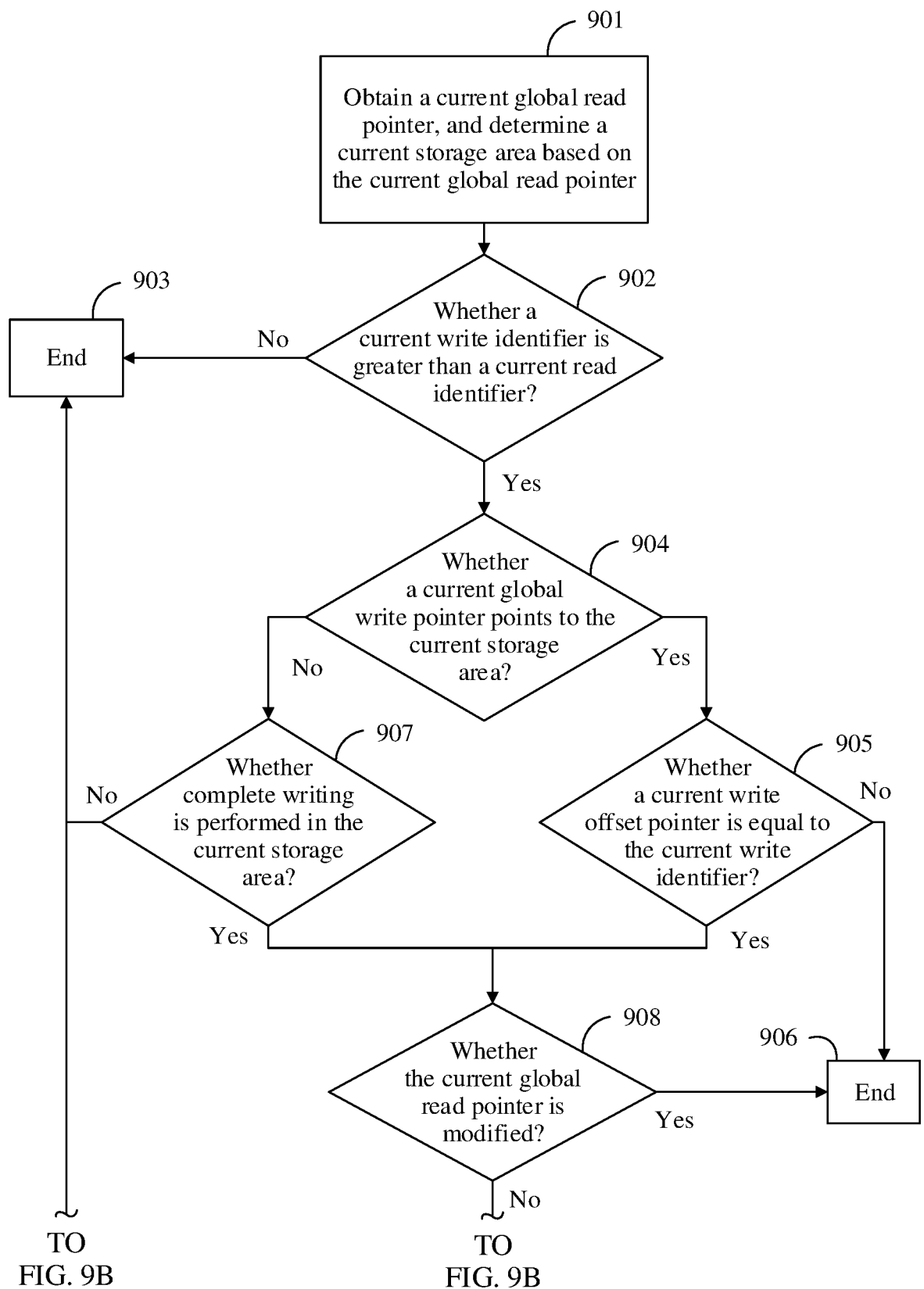
FIG. 9A and FIG. 9B are a second schematic flowchart of a data reading method according to this application.
Figure 9B:
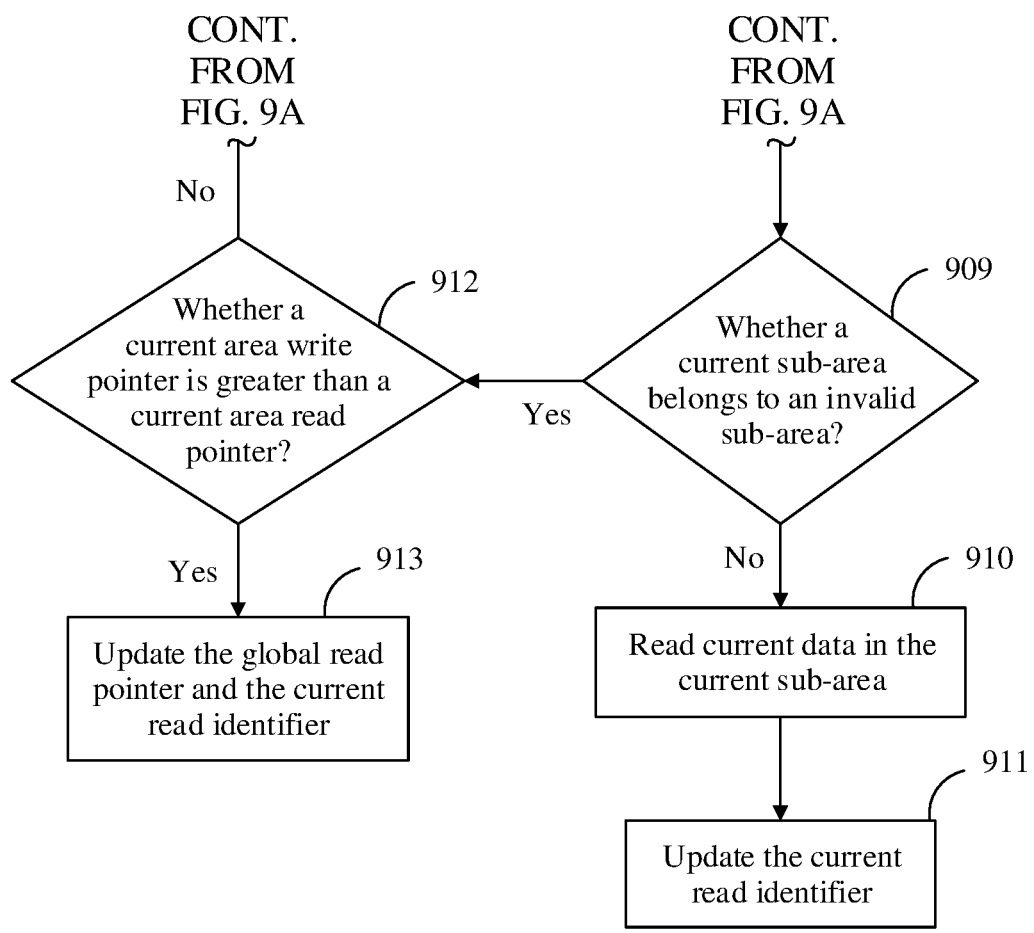

The foregoing describes the data writing method in this application. The following describes a data reading method in this application. Specifically, FIG. 9A and FIG. 9B are a second schematic flowchart of a data reading method according to this application. As shown in FIG. 9A and FIG. 9B, the data reading method includes the following steps.

In step 901, a computer device obtains a current global read pointer, and determines a current storage area based on the current global read pointer.

In step 902, the computer device determines whether a current write identifier is greater than a current read identifier. If the current write identifier is greater than the current read identifier, the computer device performs step 904. Therefore, if the current write identifier is less than or equal to the current read identifier, the computer device performs step 903.

In step 903, the procedure ends.

In step 904, the computer device determines whether a current global write pointer points to the current storage area. If the current global write pointer points to the current storage area, the computer device performs step 905. If the current global write pointer points to a storage area other than the current storage area, the computer device performs step 907.

In step 905, the computer device determines whether a current area write offset pointer is equal to the current write identifier. If the current area write offset pointer is not equal to the current write identifier, the computer device performs step 906. If the current area write offset pointer is equal to the current write identifier, the computer device performs step 908.

In step 906, the procedure ends.

In step 907, the computer device determines whether complete writing is performed in the current storage area. If complete writing is not performed in the current storage area, the computer device performs step 903. If complete writing is performed in the current storage area, the computer device performs step 908.

In step 908, the computer device determines whether the current global read pointer is modified. In step 901, the computer device obtains the current global read pointer. In the multi-thread concurrency scenario, another thread may have modified the current global read pointer. For example, the another thread completes subsequent step 910. Therefore, the computer device obtains a current global read pointer herein again. If the current global read pointers obtained twice are the same, the computer device determines that the current global read pointer is not modified. If the current global read pointers obtained twice are different, the computer device determines that the current global read pointer is not modified. If the current global read pointer is not modified, the computer device performs step 909. If the current global read pointer is modified, the computer device performs step 906.

In step 909, the computer device determines whether a current sub-area belongs to an invalid sub-area. It can be learned from the foregoing description that the current global read pointer points to the current sub-area. If the current sub-area does not belong to an invalid sub-area, the computer device performs step 910. If the current sub-area belongs to an invalid sub-area, the computer device performs step 912.

In step 910, the computer device reads current data in the current sub-area. A current thread of the computer device performs a head preemption operation. If the head preemption succeeds, the computer device reads the current data in the current sub-area. If the head preemption succeeds, it indicates that the computer device updates the current global read pointer. An updated current global read pointer points to a first byte of a next sub-area of the current sub-area. The computer device uses the updated current global read pointer as the current global read pointer. If the head preemption fails, the computer device performs step 906.

In step 911, the computer device updates the current read identifier. An updated current read identifier is equal to a sum of a data size of current data and the current read identifier. For example, the current read identifier is equal to 250. The data size of the current data is 40 bytes. The updated current read identifier is equal to 290.

In step 912, the computer device determines whether a current area write pointer is greater than a current area read pointer. If the current area write pointer is greater than the current area read pointer, the computer device performs step 913. If the current area write pointer is less than or equal to the current area read pointer, the computer device performs step 903.

In step 913, the computer device updates the current global read pointer and the current global read pointer. An updated current global read pointer points to a next storage area of the current storage area. Specifically, the updated current global read pointer points to a first sub-area of the next storage area. The computer device updates the current global read pointer. The updated current global read pointer is equal to a sum of the current global read pointer and a space size of a target invalid sub-area. For a description of the target invalid sub-area, refer to the related description of FIG. 4A and FIG. 4B.

It should be understood that FIG. 9A and FIG. 9B, and FIG. 7A and FIG. 7B have some similar steps. Therefore, for a description of FIG. 9A and FIG. 9B, refer to the description of FIG. 7A and FIG. 7B. For example, for a description of step 901, refer to the description of step 701 in FIG. 7A. For descriptions of step 902 to step 907, refer to the descriptions of step 704 to step 709. For a description of step 907, refer to the description of step 713. For descriptions of step 910 and step 911, refer to the description of step 714. For a description of step 912, refer to the description of step 715.

Figure 10:
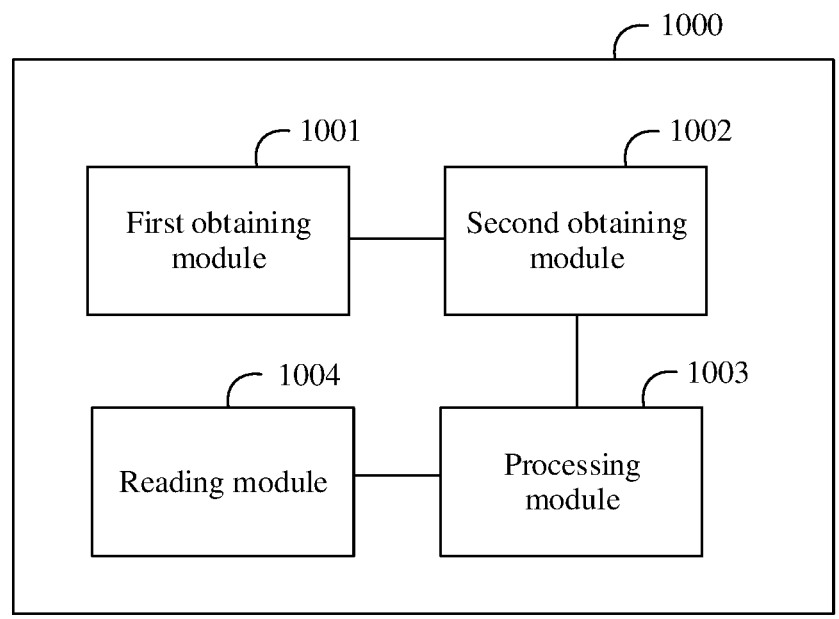
FIG. 10 is a schematic diagram of a structure of a data processing apparatus according to this application.

The foregoing describes the data processing method in this application. The following describes a data processing apparatus in this application. FIG. 10 is a schematic diagram of a structure of a data processing apparatus according to this application. As shown in FIG. 10, the data processing apparatus 1000 includes a first obtaining module 1001, a second obtaining module 1002, a processing module 1003, and a reading module 1004. The first obtaining module 1001 is configured to obtain a first global read pointer of a circular storage queue. The circular storage queue includes M storage areas. Herein, M is an integer greater than 1. The first global read pointer points to a first storage area in the M storage areas. The second obtaining module 1002 is configured to obtain a first write identifier of the first storage area. The first write identifier indicates a size of space of stored data in the first storage area. The processing module 1003 is configured to determine a size of allocated space in the first storage area. The reading module 1004 is configured to: if a first condition is met, read first data in a first sub-area. The first condition includes that the size of the space of the stored data in the first storage area is equal to the size of the allocated space in the first storage area.

In another embodiment, the data processing apparatus 1000 may further include an updating module, a resetting module, and the like. The modules in the program running apparatus are specifically configured to perform all or some operations that can be performed by the computer device in the embodiment corresponding to FIG. 2, FIG. 4A and FIG. 4B, FIG. 7A and FIG. 7B, FIG. 8A and FIG. 8B, or FIG. 9A and FIG. 9B.

Figure 11:
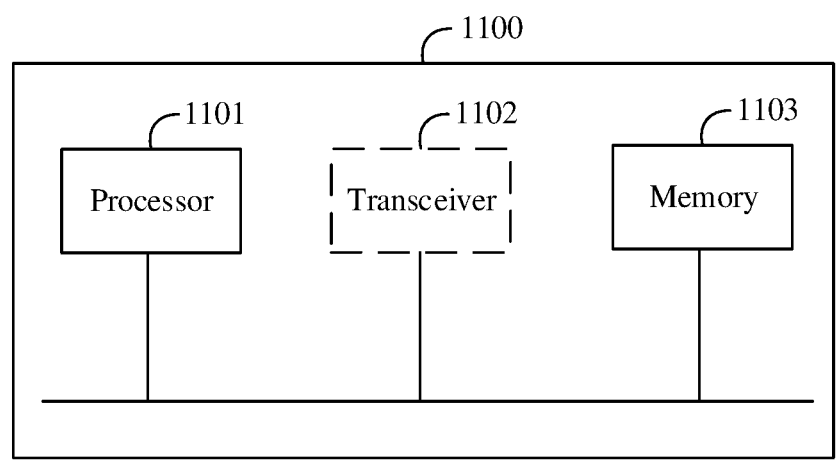
FIG. 11 is a schematic diagram of a structure of a computer device according to this application.

The foregoing describes the data processing apparatus in this application. The following describes a computer device in embodiments of this application. FIG. 11 is a schematic diagram of a structure of a computer device according to this application. The computer device 1100 in this application may be a desktop computer, a notebook computer, a smartphone, a switch, a base station, or the like. As shown in FIG. 11, the computer device 1100 includes a processor 1101 and a memory 1103.

The processor 1101 may be a central processing unit (CPU), a network processor (NP), or a combination of a CPU and an NP. The processor 1101 may further include a hardware chip or another general-purpose processor. The hardware chip may be an application-specific integrated circuit (ASIC), a programmable logic device (PLD), or a combination thereof. The PLD may be a complex programmable logic device (CPLD), a field programmable gate array (FPGA), generic array logic (GAL) or another programmable logic device, a discrete gate or a transistor logic device, a discrete hardware component, or the like, or any combination thereof. The general-purpose processor may be a microprocessor, or the processor may be any conventional processor or the like.

The memory 1103 may be a volatile memory or a non-volatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through an example rather than limitative description, many forms of RAMs may be used, for example, a static random access memory (SRAM), a dynamic random access memory (DRAM), a synchronous dynamic random access memory (SDRAM), and the like.

The memory 1103 stores a first global read pointer of a circular storage queue. The circular storage queue includes M storage areas. Herein, M is an integer greater than 1. The first global read pointer points to a first storage area in the M storage areas. The memory 1103 further stores a first write identifier of the first storage area. The first write identifier indicates a size of space of stored data in the first storage area. The processor 1101 is configured to determine a size of allocated space in the first storage area. The processor 1101 is configured to: if a first condition is met, read first data in a first sub-area. The first condition includes that the size of the space of the stored data in the first storage area is equal to the size of the allocated space in the first storage area.

In another embodiment, the computer device further includes a transceiver 1102. The transceiver 1102 may be an optical fiber transceiver, a radio frequency module, or the like.

In another embodiment, the memory 1103 stores a computer program that can be executed by the processor 1101. When reading and executing the computer program, the processor 1101 may perform all or some of operations that may be performed in the data processing method in FIG. 2, FIG. 4A and FIG. 4B, FIG. 7A and FIG. 7B, FIG. 8A and FIG. 8B, or FIG. 9A and FIG. 9B.

This application further provides a digital processing chip. A circuit and one or more interfaces that are configured to implement functions of the processor 1101 are integrated into the digital processing chip. When a memory is integrated into the digital processing chip, the digital processing chip may complete the steps in the method in any one or more of the foregoing embodiments. When a memory is not integrated into the digital processing chip, the digital processing chip may be connected to an external memory through an interface. The digital processing chip implements the data processing method in FIG. 2, FIG. 4A and FIG. 4B, FIG. 7A and FIG. 7B, FIG. 8A and FIG. 8B, or FIG. 9A and FIG. 9B based on program code stored in the external memory.

The foregoing description is merely specific implementations of this application, but is not intended to limit the protection scope of this application. Any variation or replacement readily figured out by a person skilled in the art within the technical scope disclosed in this application shall fall within the protection scope of this application.

What is claimed is:

1. A method for data processing, comprising:
    obtaining a first global read pointer of a circular storage queue, wherein the circular storage queue comprises M storage areas, M is an integer greater than 1, and the first global read pointer points to a first sub-area of a first storage area in the M storage areas;
    obtaining a first write identifier of the first storage area, wherein the first write identifier indicates a size of space of stored data in the first storage area; and
    in response to determining that a first condition is met, reading first data in the first sub-area, wherein
    the first condition comprises that the size of the space of the stored data in the first storage area is equal to a size of allocated space in the first storage area and that the first write identifier of the first storage area is greater than a first read identifier of the first storage area, and wherein before the reading first data in the first sub-area, the method further comprises:
        obtaining the first read identifier of the first storage area, wherein the first read identifier indicates a data size of read data in the first storage area; and
        determining a value relationship between the first write identifier and the first read identifier.

2. The method according to claim 1, wherein the method further comprises:
    determining a size of allocated space in the first storage area based on a first global write pointer of the circular storage queue; and either
    in response to determining that the first global write pointer points to a storage area other than the first storage area, determining that the size of the allocated space in the first storage area is equal to a size of total space of the first storage area; or
    in response to determining that the first global write pointer points to the first storage area, determining that the size of the allocated space in the first storage area is equal to a difference between a location of a first byte and a start location of the first storage area, wherein the first global write pointer points to the first byte in the first storage area.

3. The method according to claim 2, wherein a size of the first sub-area and a size of the first data each are X bytes, and X is an integer greater than 0; and
    after the reading first data in the first sub-area, the method further comprises:
        updating a first read identifier of the first storage area based on X, wherein an updated first read identifier is equal to a sum of the first read identifier and X.

4. The method according to claim 3, wherein the method further comprises:
    obtaining a second global write pointer of the circular storage queue, wherein the second global write pointer points to a second byte in the first storage area, and the second byte is a start location of the first storage area; and
    writing the first data into the first sub-area in response to determining that a difference between a location of the second byte and an end location of the first storage area is greater than or equal to X.

5. The method according to claim 4, wherein the method further comprises:
    obtaining a third global write pointer of the circular storage queue, wherein the third global write pointer points to a third byte in the first storage area;
    obtaining a size of to-be-written second data, wherein the size of the second data is N bytes; and
    in response to determining that a location of the third byte and an end location of the first storage area indicate that a remaining area of the first storage area is less than N bytes, adding a target identifier to the remaining area, wherein the target identifier indicates that the remaining area is an invalid sub-area.

6. The method according to claim 1, wherein before the reading first data in the first sub-area, the method further comprises:
    determining whether the first sub-area is an invalid sub-area; and
    the first condition further comprises that the first sub-area is not an invalid sub-area.

7. The method according to claim 5, wherein the method further comprises:
    in response to determining that a second condition is met, updating the third global write pointer, wherein an updated third global write pointer points to a second storage area, and the second storage area is a next storage area of the first storage area; and
    the second condition comprises that
    the second storage area is not allocated; or a third global read pointer points to a storage area other than the second storage area, and a quotient obtained by dividing a second write identifier of the second storage area by a size of total space of the second storage area is equal to an integer, wherein the second write identifier indicates a size of space of stored data in the second storage area.

8. The method according to claim 7, wherein before the updating the third global write pointer, the method further comprises:
    resetting the second write identifier, wherein
    the first global read pointer comprises a first area read pointer and a first area read offset pointer, the first area read pointer points to the first storage area, the first area read offset pointer points to a second byte in the first storage area, and the first global write pointer comprises a first area write pointer and a first area write offset pointer; and
    after the reading first data in the first sub-area, the method further comprises:
        in response to determining that a difference between the first area read pointer and the first area write pointer is greater than M, resetting the first read identifier.

9. The method according to claim 8, wherein the method further comprises:
    in response to determining that the difference between the first area read pointer and the first area write pointer is greater than M, updating the first area read pointer, wherein an updated first area read pointer is equal to a difference between the first area write pointer and Z, and Z=M−1.

10. The method according to claim 7, wherein
the second condition further comprises that a quotient obtained by dividing a second read identifier of the second storage area by the size of the total space of the second storage area is equal to an integer, wherein the second read identifier indicates a data size of read data in the second storage area.

11. A computer device, comprising at least one memory and at least one processor coupled to the at least one memory, wherein
the at least one memory stores a first global read pointer of a circular storage queue, wherein the circular storage queue comprises M storage areas, M is an integer greater than 1, and the first global read pointer points to a first storage area in the M storage areas;
the at least one memory further stores a first write identifier of the first storage area, wherein the first write identifier indicates a size of space of stored data in the first storage area; and
the at least one memory further stores a computer program for execution by the at least one processor to cause the at least one processor to:
determine a size of allocated space in the first storage area; and
in response to determining that a first condition is met, read first data in a first sub-area, wherein
the first condition comprises that the size of the space of the stored data in the first storage area is equal to the size of the allocated space in the first storage area and that the first write identifier of the first storage area is greater than a first read identifier of the first storage area, and wherein the computer program is for execution by the at least one processor to further cause the at least one processor to, before the reading first data in the first sub-area:
obtain the first read identifier of the first storage area, wherein the first read identifier indicates a data size of read data in the first storage area; and
determine a value relationship between the first write identifier and the first read identifier.

12. A non-transitory computer-readable storage medium storing a computer program for execution by at least one processor to cause the at least one processor to perform operations comprising:
obtaining a first global read pointer of a circular storage queue, wherein the circular storage queue comprises M storage areas, M is an integer greater than 1, and the first global read pointer points to a first sub-area of a first storage area in the M storage areas;
obtaining a first write identifier of the first storage area, wherein the first write identifier indicates a size of space of stored data in the first storage area; and
in response to determining that a first condition is met, reading first data in the first sub-area, wherein
the first condition comprises that the size of the space of the stored data in the first storage area is equal to a size of allocated space in the first storage area and that the first write identifier of the first storage area is greater than a first read identifier of the first storage area, wherein the operations further comprise before the reading first data in the first sub-area:
obtaining the first read identifier of the first storage area, wherein the first read identifier indicates a data size of read data in the first storage area; and
determining a value relationship between the first write identifier and the first read identifier.

13. The non-transitory computer-readable storage medium according to claim 12, wherein the operations further comprise:
determining a size of allocated space in the first storage area based on a first global write pointer of the circular storage queue; and either
in response to determining that the first global write pointer points to a storage area other than the first storage area, determining that the size of the allocated space in the first storage area is equal to a size of total space of the first storage area; or
in response to determining that the first global write pointer points to the first storage area, determining that the size of the allocated space in the first storage area is equal to a difference between a location of a first byte and a start location of the first storage area, wherein the first global write pointer points to the first byte in the first storage area.

14. The non-transitory computer-readable storage medium according to claim 13, wherein a size of the first sub-area and a size of the first data each are X bytes, and X is an integer greater than 0; and
the operations further comprise after the reading first data in the first sub-area:
updating a first read identifier of the first storage area based on X, wherein an updated first read identifier is equal to a sum of the first read identifier and X.

15. The non-transitory computer-readable storage medium according to claim 14, wherein the operations further comprise:
obtaining a second global write pointer of the circular storage queue, wherein the second global write pointer points to a second byte in the first storage area, and the second byte is a start location of the first storage area; and
writing the first data into the first sub-area in response to determining that a difference between the location of the second byte and an end location of the first storage area is greater than or equal to X.

16. The non-transitory computer-readable storage medium according to claim 15, wherein the operations further comprise:
obtaining a third global write pointer of the circular storage queue, wherein the third global write pointer points to a third byte in the first storage area;
obtaining a size of to-be-written second data, wherein the size of the second data is N bytes; and
in response to determining that a location of the third byte and an end location of the first storage area indicate that a remaining area of the first storage area is less than N bytes, adding a target identifier to the remaining area, wherein the target identifier indicates that the remaining area is an invalid sub-area.

17. The non-transitory computer-readable storage medium according to claim 12, wherein the operations further comprise before the reading first data in the first sub-area:
determining whether the first sub-area is an invalid sub-area; and wherein
the first condition further comprises that the first sub-area is not an invalid sub-area.

18. The non-transitory computer-readable storage medium according to claim 12, wherein the operations further comprise:

in response to determining that a second condition is met, updating a third global write pointer, wherein an updated third global write pointer points to a second storage area, and the second storage area is a next storage area of the first storage area; and the second condition comprises the second storage area is not allocated; or a third global read pointer points to a storage area other than the second storage area, and a quotient obtained by dividing a second write identifier of the second storage area by a size of total space of the second storage area is equal to an integer, wherein the second write identifier indicates a size of space of stored data in the second storage area.

* * * * *